(12) United States Patent  
Matsuda

(10) Patent No.: US 7,006,249 B2  
(45) Date of Patent: Feb. 28, 2006

(54) IMAGE FORMING SYSTEM

(75) Inventor: Yoji Matsuda, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1074 days.

(21) Appl. No.: 09/761,777

(22) Filed: Jan. 18, 2001

(65) Prior Publication Data

US 2002/0093675 A1      Jul. 18, 2002

(51) Int. Cl.  
    *G06F 15/00*   (2006.01)
(52) U.S. Cl. .................. 358/1.9; 358/1.2; 358/1.15; 358/401; 358/448; 399/85; 399/81; 399/82; 700/3; 709/208; 709/209
(58) Field of Classification Search ............... 358/1.2, 358/1.9, 1.15, 401, 407, 444, 448; 399/48, 399/85, 82, 81; 345/1.1; 375/133  
See application file for complete search history.

(56) References Cited

U.S. PATENT DOCUMENTS

| | | | | |
|---|---|---|---|---|
| 4,149,241 A | * | 4/1979 | Patterson | 710/107 |
| 5,455,688 A | * | 10/1995 | Furukawa et al. | 358/442 |
| 5,515,512 A | | 5/1996 | Yamamoto | 395/200.03 |
| 5,715,066 A | | 2/1998 | Kurita et al. | 358/296 |
| 5,764,866 A | * | 6/1998 | Maniwa | 358/1.15 |
| 5,809,363 A | | 9/1998 | Kitamura et al. | 399/8 |
| 5,812,747 A | * | 9/1998 | Kayano et al. | 358/1.15 |
| 5,848,240 A | | 12/1998 | Yamamoto | 395/200.43 |
| 5,933,584 A | * | 8/1999 | Maniwa | 358/1.15 |
| 6,160,638 A | * | 12/2000 | Yasuda | 358/438 |
| 6,212,221 B1 | * | 4/2001 | Wakayama et al. | 375/133 |
| 6,321,266 B1 | * | 11/2001 | Yokomizo et al. | 709/226 |
| 6,374,262 B1 | * | 4/2002 | Kodama | 707/201 |
| 6,438,574 B1 | * | 8/2002 | Nagashima | 718/102 |
| 6,609,162 B1 | * | 8/2003 | Shimizu et al. | 710/15 |
| 6,714,172 B1 | * | 3/2004 | Matsuzaki et al. | 345/1.1 |
| 6,718,378 B1 | * | 4/2004 | Machida | 709/223 |
| 6,771,386 B1 | * | 8/2004 | Kato | 358/1.15 |
| 2003/0208644 A1 | * | 11/2003 | Shimizu et al. | 710/15 |

FOREIGN PATENT DOCUMENTS

| | | |
|---|---|---|
| JP | 7-65145 | 3/1995 |
| JP | 7-147615 | 6/1995 |
| JP | 7-321974 A | 12/1995 |
| JP | 8-289053 | 11/1996 |
| JP | 9-40305 A | 2/1997 |
| JP | 10-269157 A | 10/1998 |
| JP | 2998966 | 1/2000 |

* cited by examiner

*Primary Examiner*—Kimberly Williams  
*Assistant Examiner*—Beniyam Menberu  
(74) *Attorney, Agent, or Firm*—Foley & Lardner LLP

(57) ABSTRACT

A plurality of devices for reading document images are connected through a network. A master device and slave devices are set among the devices. Read conditions and image forming conditions are respectively notified to the slave devices by the master device. Each slave device reads an original document based on the read condition, and outputs the read image data attached with the image forming condition, to the print device. The print device prints image data from various read devices under the image forming conditions attached thereto, thereby to print image data from the plurality of read devices, integrated with each other.

11 Claims, 38 Drawing Sheets

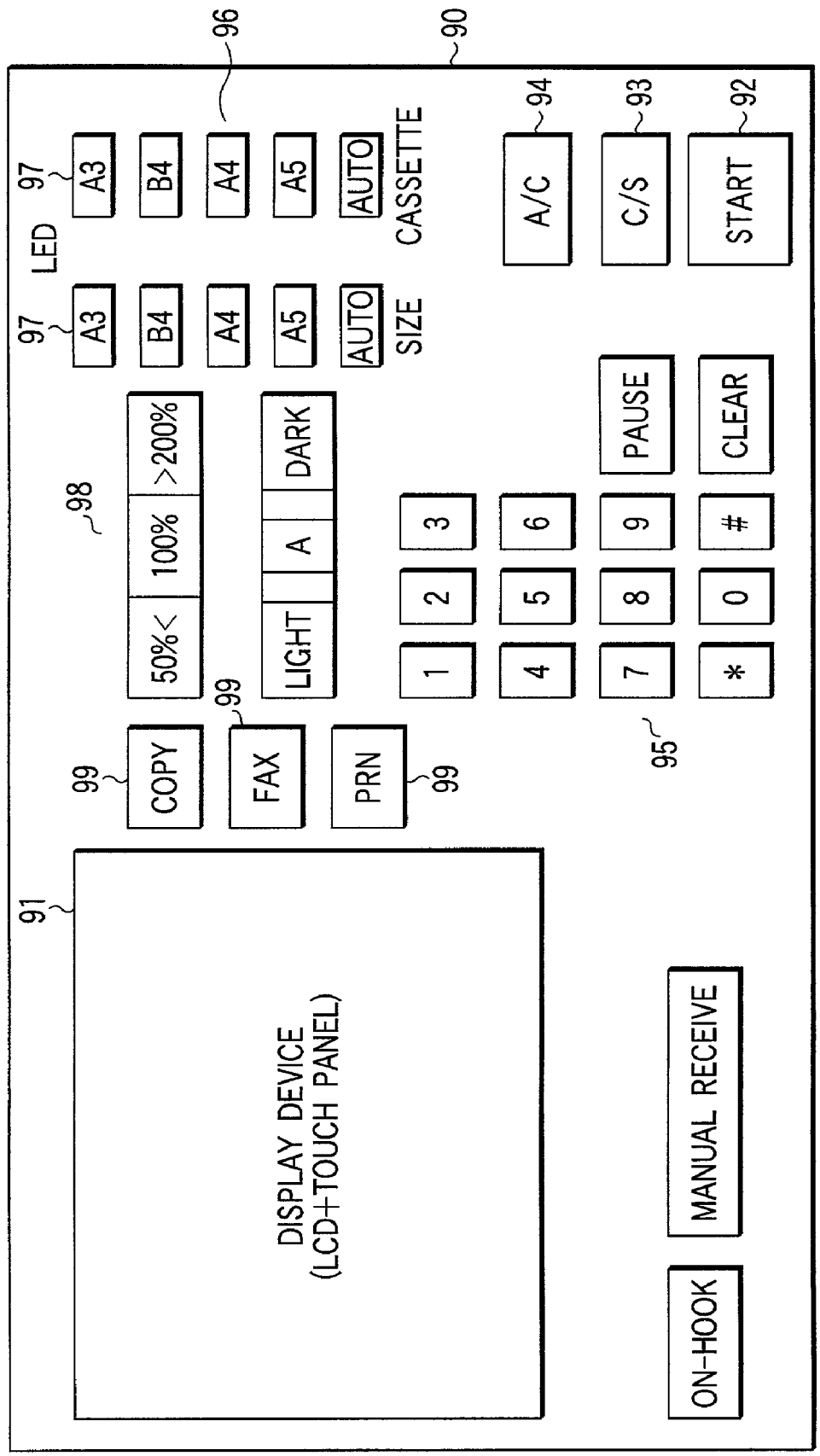
F I G. 5

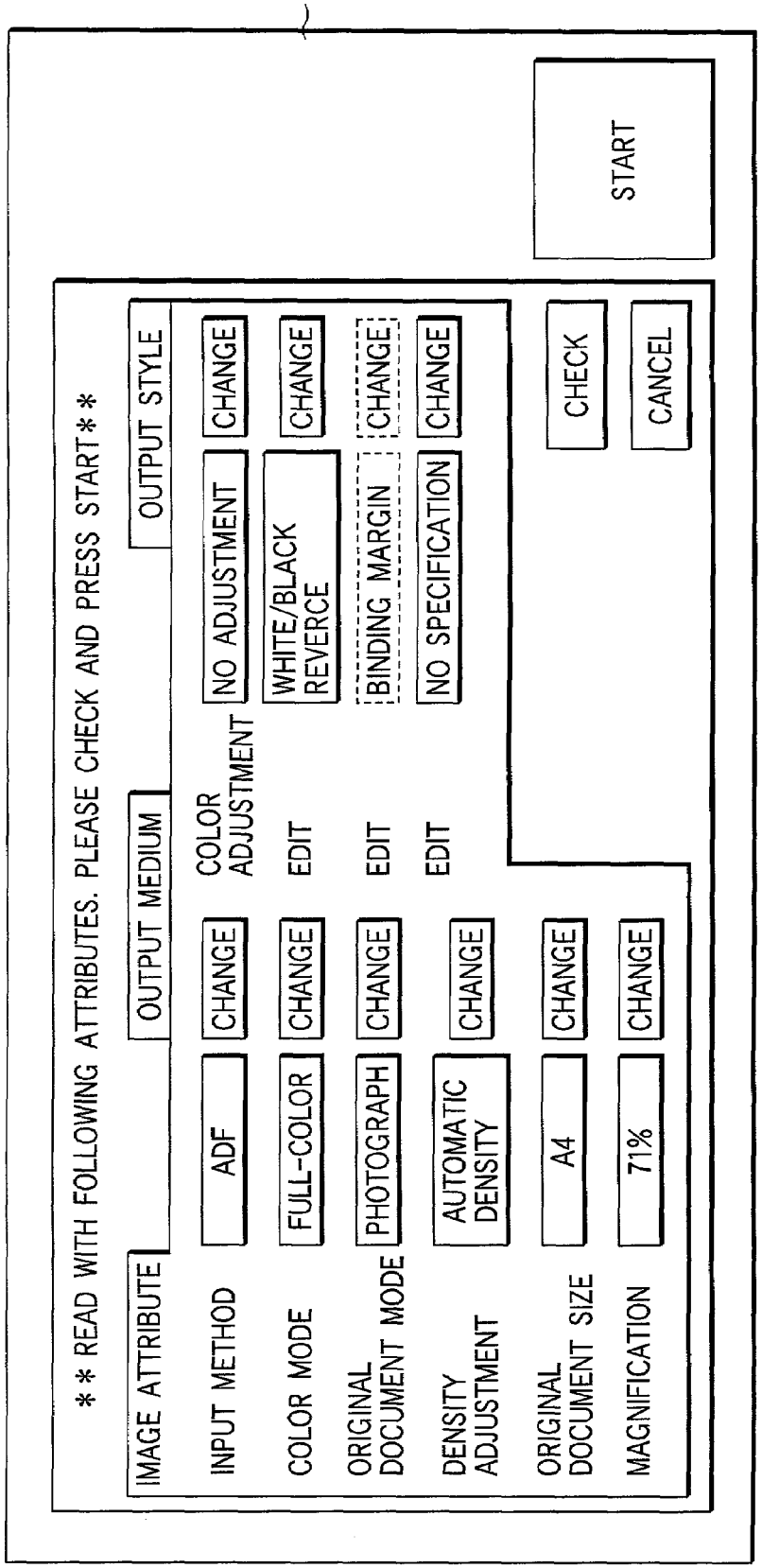
F I G. 8

PAGE TOP ← → PAGE END
| MEMORY FOR INPUT DEVICE (0) MASTER DEVICE ID NUMBER : 0  P1~P31 | MEMORY FOR INPUT DEVICE (1) SLAVE DEVICE ID NUMBER : 1  P32~P63 | MEMORY FOR INPUT DEVICE (2) ID NUMBER : FF NOT USED | MEMORY FOR INPUT DEVICE (3) SLAVE DEVICE ID NUMBER : 2  P64~P104 | MEMORY FOR INPUT DEVICE (4) ID NUMBER : FF NOT USED |
F I G. 11

(IMAGE FILE MANAGEMENT TABLE)

| JOBID | 0x01 |
|---|---|
| INPUT DEVICE INFORMATION | 0x0C |
| PAGE NUMBER (DEVICE 0) | 0x1F |
| PAGE NUMBER (DEVICE 1) | 0x20 |
| PAGE NUMBER (DEVICE 2) | 0 |
| PAGE NUMBER (DEVICE 3) | 0x29 |
| PAGE NUMBER (DEVICE 4) | 0 |
| PAGE NUMBER (DEVICE 5) | 0 |
| PAGE NUMBER (DEVICE 6) | 0 |
| PAGE NUMBER (DEVICE 7) | 0 |
| INPUT OPERATION STATUS | INPUTTING |
| TOTAL PAGE | 0x68 |
| OUTPUT DEVICE SPECIFICATION | 0x05 |

~138a

F I G. 12

(COPY ATTRIBUTE/STYLE/MEDIUM INFORMATION TABLE)

| | | |
|---|---|---|
| IMAGE ATTRIBUTES | INPUT DEVICE NUMBER | 0x00 |
| | JOBID | 0x01 |
| | FILE NAME | 1_0_***.jpg |
| | PAGE NUMBER | 0x1F |
| | INPUT METHOD | ADF |
| | ORIGINAL DOCUMENT SIZE | A4 |
| | MAGNIFICATION | 71 |
| | COLOR OR BLACK | COLOR |
| | FORMAT | JPEG |
| | DENSITY ADJUSTMENT | AUTOMATIC |
| | COLOR ADJUSTMENT | NO ADJUSTMENT |
| | EDIT | WHITE/BLACK REVERSE |
| | EDIT | BINDING MARGIN |
| | EDIT | NOT SPECIFIED |
| | MODE | PHOTOGRAPH |
| OUTPUT MEDIUM | MEDIUM | THICK PAPER |
| | SUPPLY SOURCE | 1ST CASSETTE |
| OUTPUT STYLE | OUTPUT STYLE | 40° |
| | DOUBLE-SIDED OUTPUT | SINGLE-SIDE |
| | FINISH | STAPLE |
| | SORT MODE | SORT |
| IMAGE ATTRIBUTES | INPUT DEVICE NUMBER | 0x01 |
| | JOBID | 0x01 |
| | FILE NAME | 1_0_***.jpg |
| | PAGE NUMBER | 0x20 |
| | INPUT METHOD | ADF |
| | ORIGINAL DOCUMENT SIZE | A4 |
| | MAGNIFICATION | 100 |
| | COLOR OR BLACK | BLACK |
| | FORMAT | JPEG |
| | DENSITY ADJUSTMENT | AUTOMATIC |
| | COLOR ADJUSTMENT | NO ADJUSTMENT |
| | EDIT | WHITE/BLACK REVERSE |
| | EDIT | BINDING MARGIN |
| | EDIT | NOT SPECIFIED |
| | MODE | TEXT |

| | | |
|---|---|---|
| OUTPUT MEDIUM | MEDIUM | NORMAL PAPER |
| | FEED SOURCE | MANVAL INSERTION |
| OUTPUT STYLE | ROTATED OUTPUT | 90° |
| | DOUBLE-SIDED OUTPUT | NO |
| | FINISH | STAPLE |
| | SORT MODE | NON-SORT |
| | ⋮ | ⋮ |
| IMAGE ATTRIBUTES | INPUT DEVICE NUMBER | 0x07 |
| | JOBID | 0xff |
| | FILE NAME | 0xff |
| | PAGE NUMBER | 0xff |
| | INPUT METHOD | 0xff |
| | ORIGINAL DOCUMENT SIZE | 0xff |
| | MAGNIFICATION | 0xff |
| | COLOR OR BLACK | 0xff |
| | FORMAT | 0xff |
| | DENSITY ADJUSTMENT | 0xff |
| | COLOR ADJUSTMENT | 0xff |
| | EDIT | 0xff |
| | EDIT | 0xff |
| | EDIT | 0xff |
| | MODE | 0xff |
| OUTPUT MEDIUM | MEDIUM | 0xff |
| | FEED SOURCE | 0xff |
| OUTPUT STYLE | OUTPUT MEDIUM | 0xff |
| | DOUBLE-SIDED OUTPUT | 0xff |
| | FINISH | 0xff |
| | SORT MODE | 0xff |

(138b)

F I G. 14

(DEVICE MANAGEMENT TABLE)

| INPUT DEVICE NUMBER | 0x00 |
|---|---|
| OPERATION STATUS ERROR NUMBER | BEING USED |
| ERROR NUMBER | 0x00 |
| INPUT PAGE NUMBER | 0x1F |
| IP ADDRESS | 192.168.*** |
| PWD | **** |
| OPTION | ADF |
| MEMORY SIZE | 3GB |
| DEVICE IDENTIFICATION ID | 0 |
| MASTER/SLAVE DEVICE SPECIFICATION | MASTER |
| OUTPUT DEVICE SPECIFICATION | 0x00 |
| INPUT DEVICE NUMBER | 0x01 |
| OPERATION STATUS ERROR NUMBER | WORKING |
| ERROR NUMBER | 0x00 |
| INPUT PAGE NUMBER | 0x20 |
| IP ADDRESS | 192.168.*** |
| PWD | **** |
| OPTION | ADF |
| MEMORY SIZE | 48MB |
| DEVICE IDENTIFICATION ID | 1 |
| MASTER/SLAVE DEVICE SPECIFICATION | SLAVE |
| OUTPUT DEVICE SPECIFICATION | 0x00 |
| INPUT DEVICE NUMBER | 0x02 |
| OPERATION STATUS ERROR NUMBER | BEING USED |
| ERROR NUMBER | 0x00 |
| INPUT PAGE NUMBER | 0x1F |
| IP ADDRESS | 192.168.*** |
| PWD | **** |
| OPTION | ADF/ADU |
| MEMORY SIZE | 64MB |
| DEVICE IDENTIFICATION ID | 2 |
| MASTER/SLAVE DEVICE SPECIFICATION | NOT SPECIFIED |
| OUTPUT DEVICE SPECIFICATION | 0x00 |
| : | : |

~138c

F I G. 15

| INPUT DEVICE NUMBER | 0x07 |
|---|---|
| OPERATION STATUS ERROR NUMBER | 0xff |
| ERROR NUMBER | 0xff |
| INPUT PAGE NUMBER | 0xff |
| IP ADDRESS | 0xff |
| PWD | 0xff |
| OPTION | 0xff |
| MEMORY SIZE | 0xff |
| DEVICE ENTIFICATION ID | 0xff |
| MASTER/SLABE DEVICE SPECIFICATION | 0xff |
| OUTPUT DEVICE SPECIFICATION | 0x00 |

FIG. 16

(PRINT DEVICE MANAGEMENT TABLE)

| OUTPUT DEVICE NUMBER | 0x05 |
|---|---|
| OPERATION STATUS | FREE |
| COLOR PERFORMANCE | FULLCOLOR |
| ERROR NUMBER | 0x00 |
| OUTPUT PAGE NUMBER | 0xFF |
| IP ADDRESS | 192.168.*** |
| PWD | **** |
| DOUBLE-SIDED DEVICE | ON |
| SORTER | ON |
| STAPLE | ON |
| ROTATED OUTPUT | POSSIBLE |
| MEMORY CAPACITY | 3GB |
| LARGE CAPACITY PAPER FEED CASSETTE | A4 |
| 1ST CASSETTE SIZE | A4R |
| 1ST CASSETTE MEDIUM | NORMAL |
| 2ND CASSETTE SIZE | A3 |
| 2ND CASSETTE MEDIUM | NORMAL |
| 3RD CASSETTE SIZE | A4 |
| 3RD CASSETTE MEDIUM | THICK PAPER |
| 4TH CASSETTE SIZE | B4 |
| 4TH CASSETTE MEDIUM | V |
| MANUAL INSERTION SIZE | A4 |
| MANUAL INSERTION MEDIUM | COLOR-DEDICATED PAPER |

FIG. 17

(INPUT OPERATION MANAGEMENT TABLE)

| JOBID | 0x01 |
|---|---|
| MASTER DEVICE INFORMATION | 0x01 |
| INPUTTED PAGE NUMBER | 0x1F |
| OPERATION STATUS | INPUTTING |
| ERROR TYPE | 0xFF |
| SLAVE DEVICE SPECIFICATION | 0x01 |
| MASTER DEVICE SPECIFICATION | 0x00 |

(COPY ATTRIBUTE/STYLE/MEDIUM INFORMATION)

| INPUT DEVICE NUMBER | 0x00 |
|---|---|
| JOBID | 0x01 |
| FILE NAME | 1_0_***.jpg |
| PAGE NUMBER | 0x1F |
| INPUT METHOD | ADF |
| ORIGINAL DOCUMENT SIZE | A4 |
| MAGNIFICATION | 71 |
| COLOR OR BLACK | COLOR |
| FORMAT | JPEG |
| DENSITY ADJUSTMENT | AUTOMATIC |
| COLOR ADJUSTMENT | NO ADJUSTMENT |
| EDIT | WHITE/BLACK REVERSE |
| EDIT | BINDING MARGIN |
| EDIT | NOT SPECIFIED |
| MODE | PHOTOGRAPH |
| MEDIUM | THICK PAPER |
| SUPPLY SOURCE | 1ST CASSETTE |
| OUTPUT STYLE | 90° |
| DOUBLE-SIDED OUTPUT | SINGLE-SIDE |
| FINISH | STAPLE |
| SORT MODE | SORT |

IMAGE ATTRIBUTES (INPUT DEVICE NUMBER through MODE)
OUTPUT MEDIUM (MEDIUM, SUPPLY SOURCE)
OUTPUT STYLE (OUTPUT STYLE through SORT MODE) ~139b

FIG. 19

(DEVICE MANAGEMENT TABLE)

| INPUT DEVICE NUMBER | 0x00 |
|---|---|
| OPERATION STATUS ERROR NUMBER | WORKING |
| ERROR NUMBER | 0x00 |
| INPUT PAGE NUMBER | 0x20 |
| IP ADDRESS | 192.168.*** |
| PWD | **** |
| OPTION | ADF |
| MEMORY SIZE | 48MB |
| DEVICE IDENTIFICATION ID | 0 |
| SLAVE DEVICE SPECIFICATION | 0x01 |
| OUTPUT DEVICE SPECIFICATION | 0x00 |
| INPUT DEVICE NUMBER | 0x01 |
| OPERATION STATUS ERROR NUMBER | BEING USED |
| ERROR NUMBER | 0x00 |
| INPUT PAGE NUMBER | 0x1F |
| IP ADDRESS | 192.168.*** |
| PWD | **** |
| OPTION | ADF |
| MEMORY SIZE | 48MB |
| DEVICE IDENTIFICATION ID | 1 |
| SLAVE DEVICE SPECIFICATION | 0x00 |
| OUTPUT DEVICE SPECIFICATION | 0x00 |
| ⋮ | ⋮ |
| INPUT DEVICE NUMBER | 0x07 |
| OPERATION STATUS ERROR NUMBER | 0xff |
| ERROR NUMBER | 0xff |
| INPUT PAGE NUMBER | 0xff |
| IP ADDRESS | 0xff |
| PWD | 0xff |
| OPTION | 0xff |
| MEMORY SIZE | 0xff |
| DEVICE IDENTIFICATION ID | 0xff |
| SLAVE DEVICE SPECIFICATION | 0xff |
| OUTPUT DEVICE SPECIFICATION | 0x00 |

(PRINT DEVICE MANAGEMENT TABLE)

| OUTPUT DEVICE NUMBER | 0x05 |
|---|---|
| OPERATION STATUS | FREE |
| COLOR PERFORMANCE | FULLCOLOR |
| ERROR NUMBER | 0x00 |
| OUTPUT PAGE NUMBER | 0xFF |
| IP ADDRESS | 192.168.*** |
| PWD | **** |
| DOUBLE-SIDED DEVICE | ON |
| SORTER | ON |
| STAPLE | ON |
| ROTATED OUTPUT | POSSIBLE |
| MEMORY CAPACITY | 3GB |
| LARGE CAPACITY PAPER FEED CASSETTE | A4 |
| 1ST CASSETTE SIZE | A4R |
| 1ST CASSETTE MEDIUM | NORMAL |
| 2ND CASSETTE SIZE | A3 |
| 2ND CASSETTE MEDIUM | NORMAL |
| 3RD CASSETTE SIZE | A4 |
| 3RD CASSETTE MEDIUM | THICK PAPER |
| 4TH CASSETTE SIZE | B4 |
| 4TH CASSETTE MEDIUM | V |
| MANUAL INSERTION SIZE | A4 |
| MANUAL INSERTION MEDIUM | COLOR-DEDICATED PAPER |

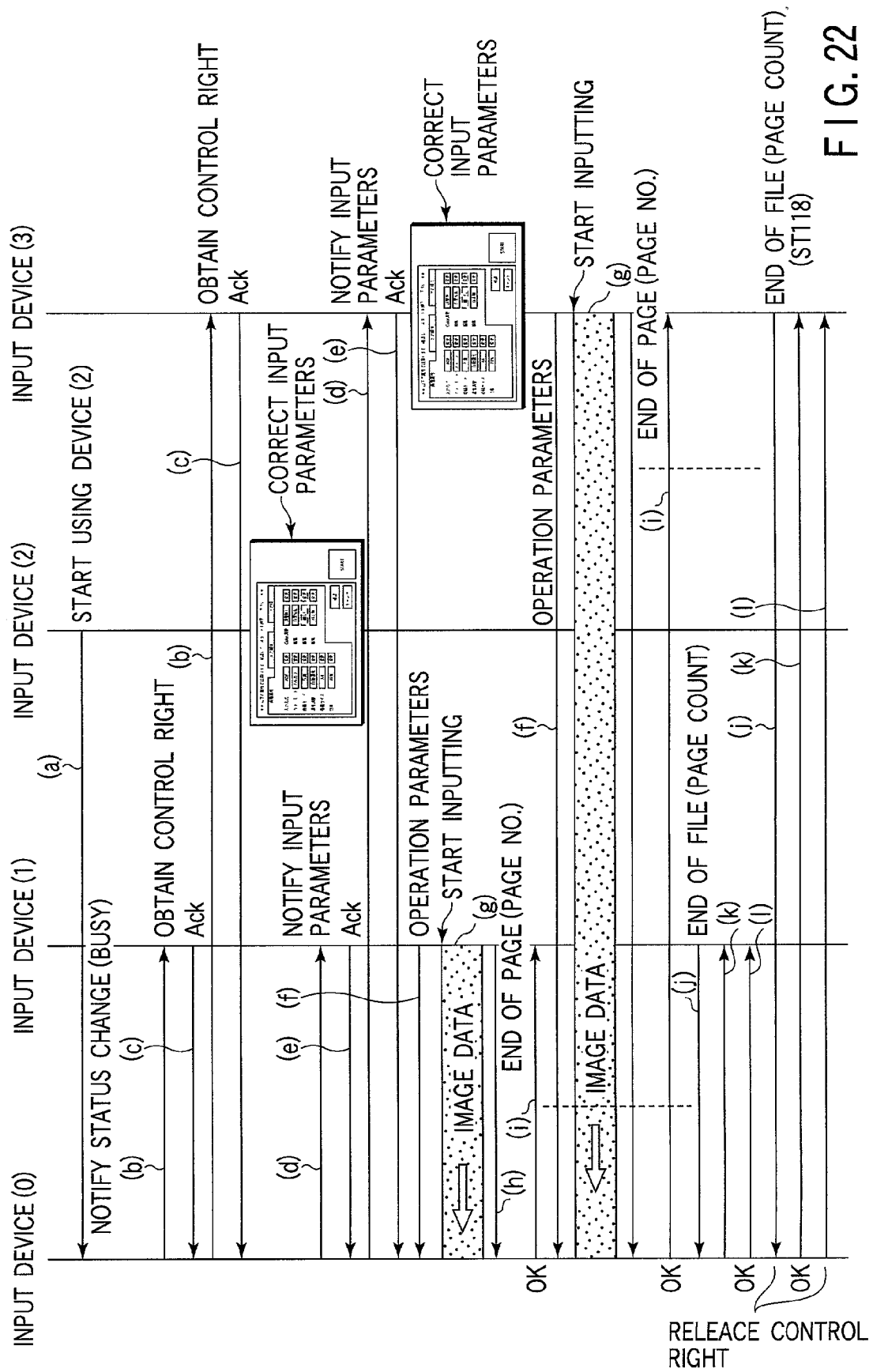

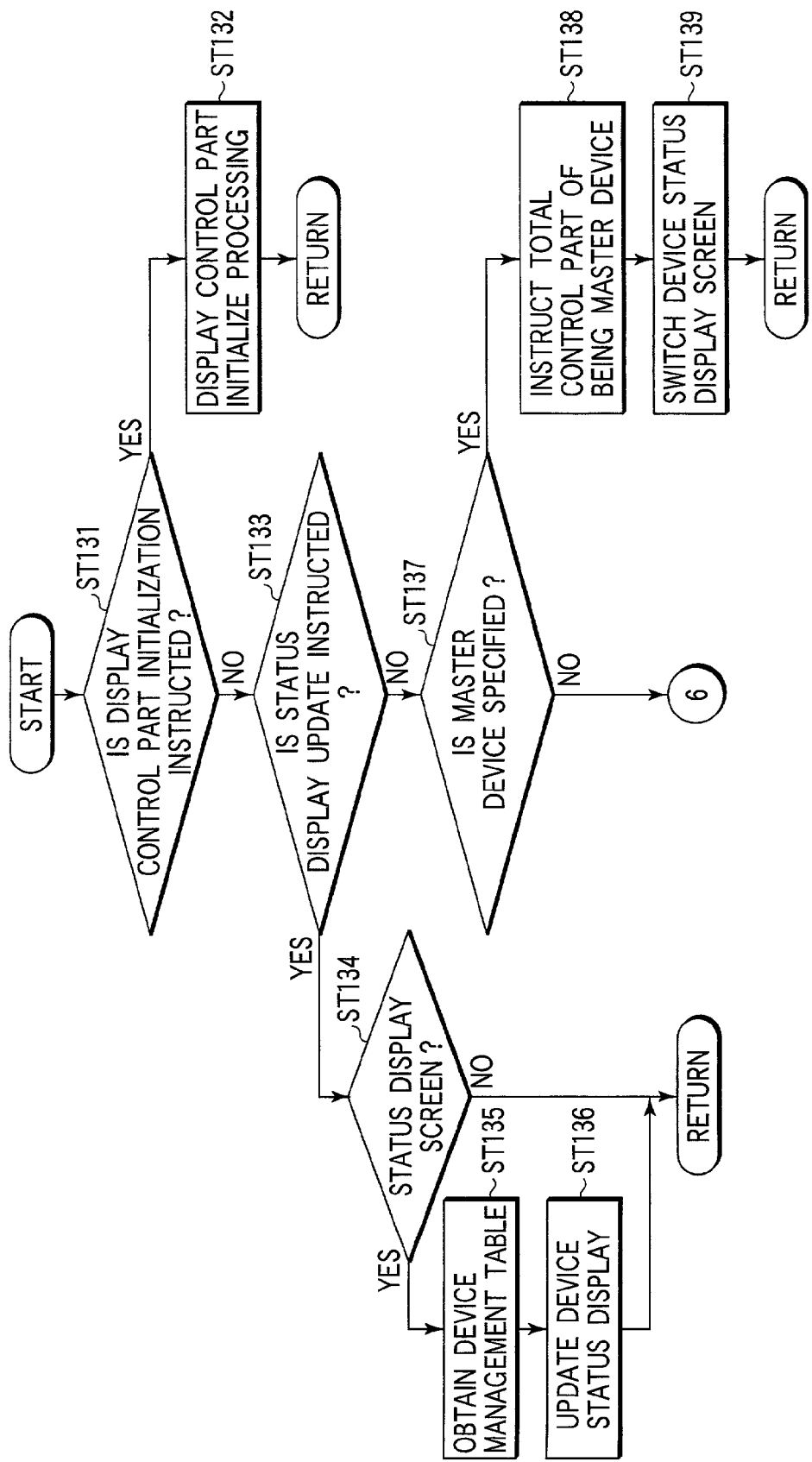
F I G. 35

IMAGE FORMING SYSTEM

BACKGROUND OF THE INVENTION

The present invention relates to an image forming system which is comprised of an input device and an output device connected by a communication means and outputs input data from the input device to the output device, thereby to form images based on the inputted data.

Conventionally, proposals have been made for a method of outputting input data from a plurality of input devices to one output device and a method for inversely outputting image data inputted from one input device to a plurality of output devices (References 1. Japanese Patent Application KOKAI Publication No. 8-289053, 2. Japanese Patent No. 2998966, 3. Japanese Patent Application KOKAI Publication No. 7-65145, and 4. Japanese Patent Application KOKAI Publication No. 7-147615).

These proposals mainly has an object of improving the throughput in copying, and propose that the device to be used can be selected among connected devices (the references 1 to 4), status information of devices can be transmitted and received (3 and 4), data input/output and communication control are possible between devices (4), and fixed addresses are assigned respectively to devices (3).

These proposals have not been intended to improve image quality or operation ability in copying in which different types of originals and also different formats of outputs are mixed. Further, the proposals have not been intended to integrate image data inputted from a plurality of input devices with respect to the references 3 and 4.

However, demands for improvement of image quality have progressed in accordance with spreading of full-color copying machines. As a result, in the present situation, requirements for image attribute parameters and output processing styles to be specified with respect to an inputted original have rapidly increased. It is therefore difficult to achieve copying operation which satisfies all conditions concerning input image attributes and input methods in one copying operation.

For example, it is difficult to carry out, by one operation, image input operation suitable for a case that a photograph-based original (photograph original) or a text-based original (text original) are mixed in a series of documents, that single-sided originals and double-sided originals are mixed, or that originals having a deep back-ground color like news papers and originals having a white back-ground color are mixed.

With respect to output media, only output pages corresponding to a specified original can be outputted but media such as OHP, thick paper, and the like are difficult to specify, in conventional techniques. In practice, however, as color originals have increased and image quality has progressed, requests are going to increase for using an output medium specialized for color at a specified part and using partially a thick paper to prevent images on both sides of a double-sided image from being seen through from both sides.

With respect to output methods, it is difficult to perform double-sided output or rotating output only with respect to a specified range of originals.

A measure for solving these problems is a method in which input images are classified for every input means, output medium, and output style, copying suitable for every attribute is carried out, and manual integration is carried out after completion of all operation. However, this measure accompanies very complicated labor, and remarkably lowers the throughput.

BRIEF SUMMARY OF THE INVENTION

The present invention has an object of providing a copy operation environment capable of easy and rapid setting and of obtaining an output result with high image quality in copying in which conditions concerning the types of original documents, instructions of output media, and output methods which are going to become more various are mixed, in an environment in which a plurality of image input devices and image forming devices are connected through a network, control signals can be transmitted/received between any of the devices, a master-slave relationship is specified between the devices, thereby to monitor operation status of the slave devices from the master device and to enable setting of operation parameters.

Also, in conventional cases where a specific function cannot be selected due to a combination of devices, screen operation is generally carried out such that the menu itself is hatched on each menu screen so that selection cannot be achieved. However, in a case where a plurality of image forming devices and input devices are connected and operation parameters thereof are specified from the master device, there is a precondition that the same parameters as those of the master device, and therefore, limitations are generally added to operations so that the menu might not be changed, the operation screen of a slave device to be specified.

The present invention has been made in view of this point. A master-slave relationship is provided between a plurality of input devices connected by any communication means such as a network or the like. Slave devices are controlled from a master device, and simultaneously, control parameters are partially rendered changeable in the side of the slave devices. In addition, an output medium and an output style are specified for every slave device, thereby to provide an environment more suitable for various input original documents and media.

As flexibility has been improved in the input side, it has become necessary for the output side to integrate image data from various kinds of input devices and to make output processing corresponding to image attributes thereof. The present invention proposes a control method for solving these problems, thereby to provide a copying environment with rich variety throughout the input and output.

According to the present invention, an image forming system constructed by a plurality of device connected comprises: a first device having at least a read function to read an original document image, a setting function to set a processing condition with respect to image data thus read, and a transmission function to process and transmit the original document image read under the processing condition set by the setting function; and a second device connected to the first device and having a change setting function to change the processing condition set by the setting function of the first device, of the original document image received from the first device, upon receipt of the original document image transmitted from the first device, and an image output function to perform processing on the original document image under the processing condition changed by the change setting function, thereby to output an image.

According to the present invention, an image read system in which a plurality of first devices having at least a read function to read at least a original document image, and a second device having at least a setting function to set a read condition are connected through a communication channel, wherein each of the first devices has a read function to read the original document, based on the read condition supplied from the second device, and the second device has setting means for setting a read condition for the read function of each of the first devices, and an interface for outputting the read condition set by the setting means to each of corresponding one or ones of the first devices.

According to the present invention, an image read system in which a plurality of first devices having at least a read function to read at least a original document image, a second device having at least a setting function to set a read condition, and a third device having at least an image forming function to form an image based on image data, on a medium where an image is to be formed, are connected through a communication channel, wherein each of the first devices is comprised of a scanner for reading the original document image, based on the read condition supplied from the second device, and a first interface for outputting the image data read by the scanner to the third device, together with an image forming condition of the image data supplied from the second device, to the third device, the second device is comprised of setting means for setting a read condition for the read function of each of the first devices, and individual image forming conditions for image data, respectively corresponding to the first devices, and a second interface for outputting the read condition set by the setting means to each of corresponding one or ones of the first devices, and the third device has an image forming device for forming an image based on image data supplied from the first devices, on an image forming medium where an image to be formed, based on the image forming condition supplied together with the image data.

BRIEF DESCRIPTION OF SEVERAL VIEWS OF THE DRAWING

FIG. 5 is a view showing an operation panel of the color image forming device;

FIGS. 7 to 9 are views showing examples of parameter check screens in the side of a slave device;

FIG. 11 is a view showing an area management image of image data storage part in the side of a master device;

FIGS. 12 to 17 are views showing examples of actual setting of the management information recording part in the master device.

FIGS. 18 to 21 are views showing examples of actual setting of the management information recording part in a slave device;

FIG. 22 is a sequence diagram showing the control procedure between a master device and slave devices when inputting an image;

FIGS. 35 to 37 are processing flowcharts in the display control part;

DETAILED DESCRIPTION OF THE INVENTION

In the following, an image forming system according to an embodiment of the present invention will be explained with reference to the drawings.

Figure 1:
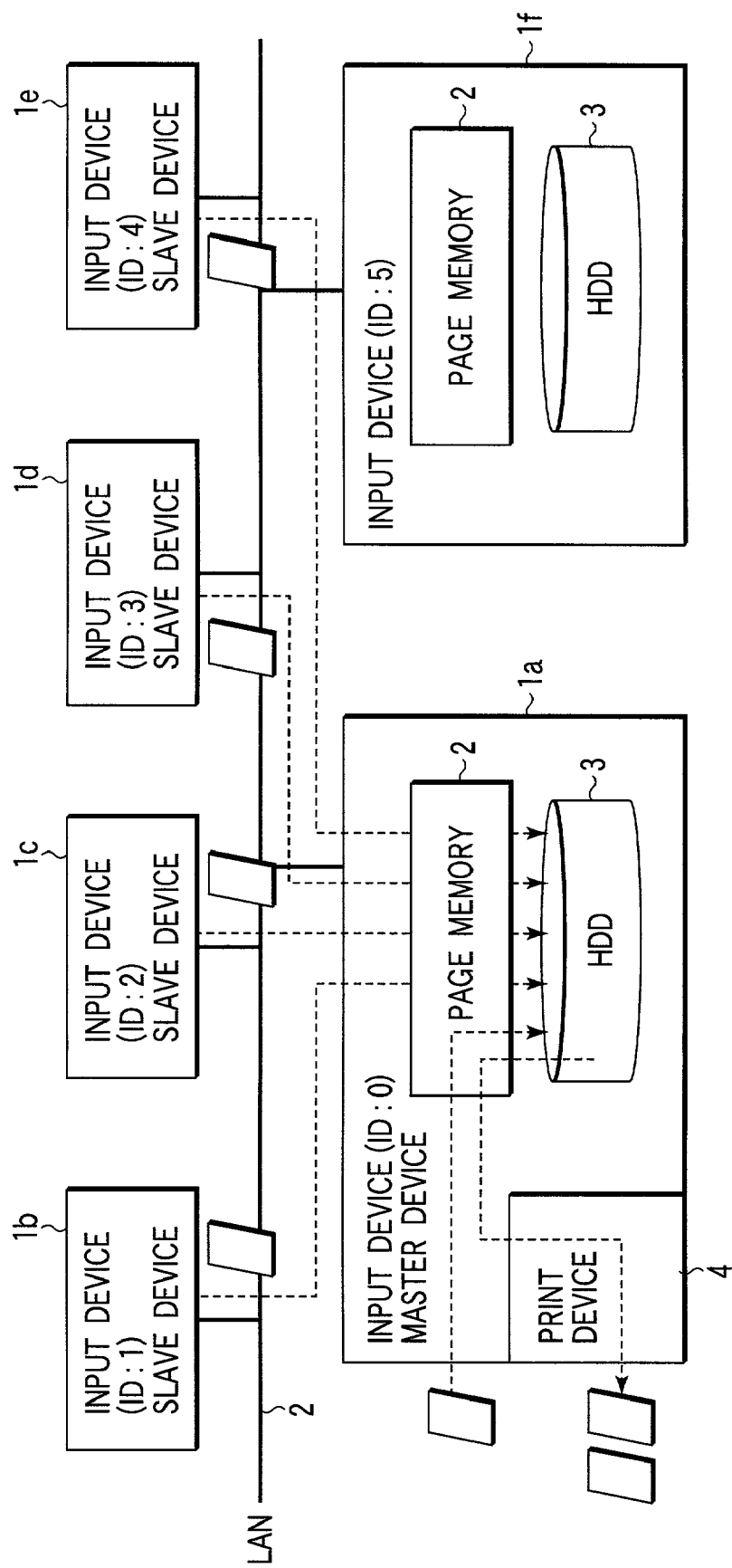
FIG. 1 is a view showing a structural example of an image forming system.
Figure 2:
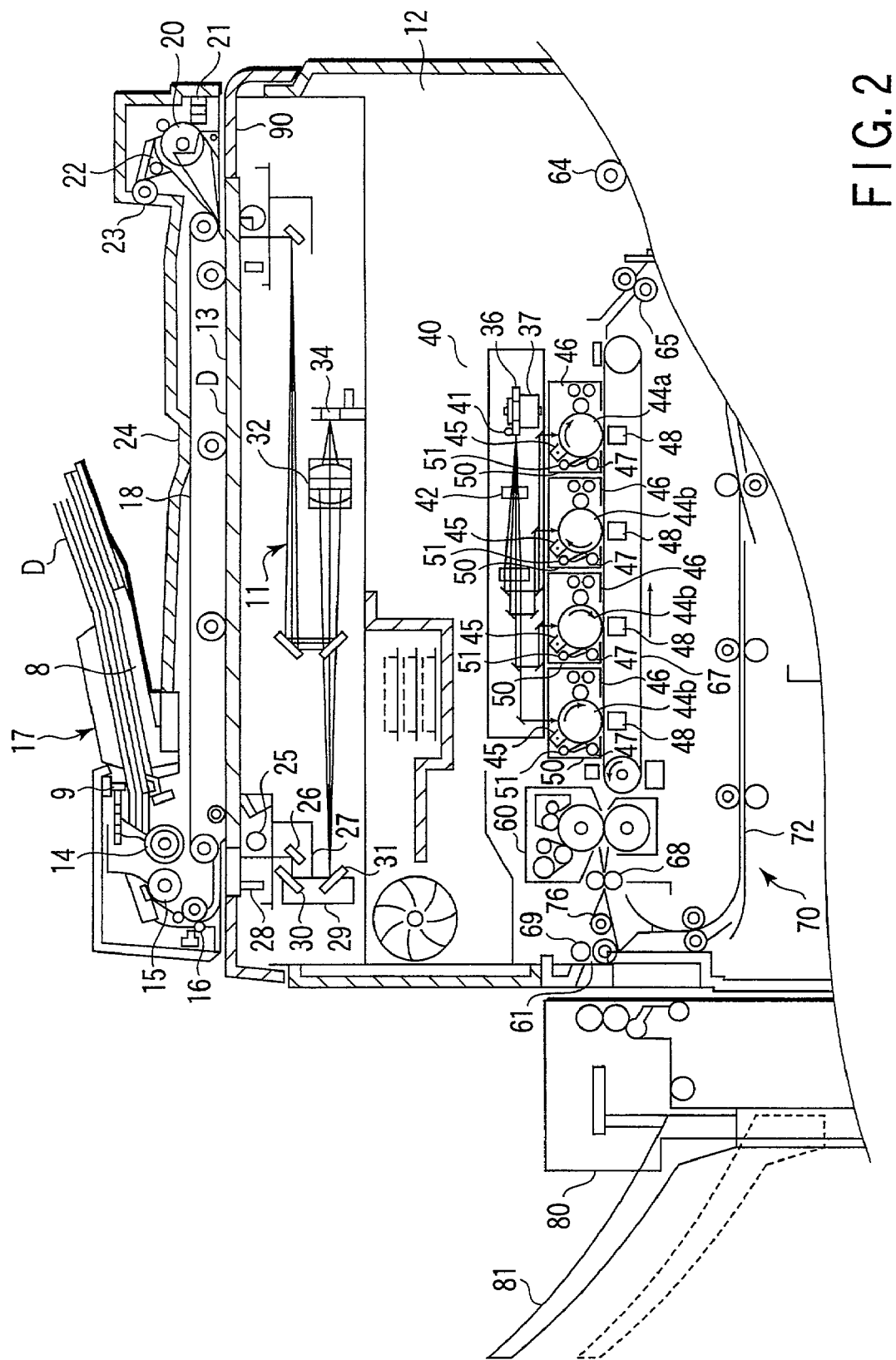
FIGS. 2 and 3 are views showing a structural example of the inside of the color image forming device.

FIGS. 1 and 2 are conceptual views showing a structural example of the image forming system.

In the image forming system, a plurality of input devices 1a, 1b, 1c, 1e, 1f, . . . such as a scanner, a personal computer, a digital copying machine (an image forming system), and the like are connected through a network 2.

The input device (ID: 0) 1a is constructed by a digital copying machine which has a function as an output device, and includes a page memory 2, a large-capacity memory device 3 such as a HDD or the like, and a printing device 4.

The input device (ID: 5) if includes a page memory 2, and a large-capacity memory device 3 such as a HDD or the like.

In the example of this figure, the input device (ID: 0) is specified as a master device, and the input devices (ID: 1 to 4) 1b, 1c, 1d, and 1e are specified as slave devices. The printing device 4 uses a printing function of the master device. This figure shows that the input device (ID: 5) 1f is not used.

Image data inputted from the input devices (ID: 1 to 4) 1b, 1c, 1d, and 1e is once stored into the large memory device 3 such as the HDD or the like of the master device 1a. In the example shown in the figure, image data of the slave devices (ID: 1 to 4) 1b, 1c, 1d, and 1e is coded data and can be stored into the HDD 3 without passing through the page memory 2 of the master device 1a. Image data inputted by the master device 1a is coded through the page memory 2 and is stored into the HDD 3.

In print outputting, coded image data is once read out and developed onto the page memory 2, and is then outputted through the printing device 4.

Figure 3:
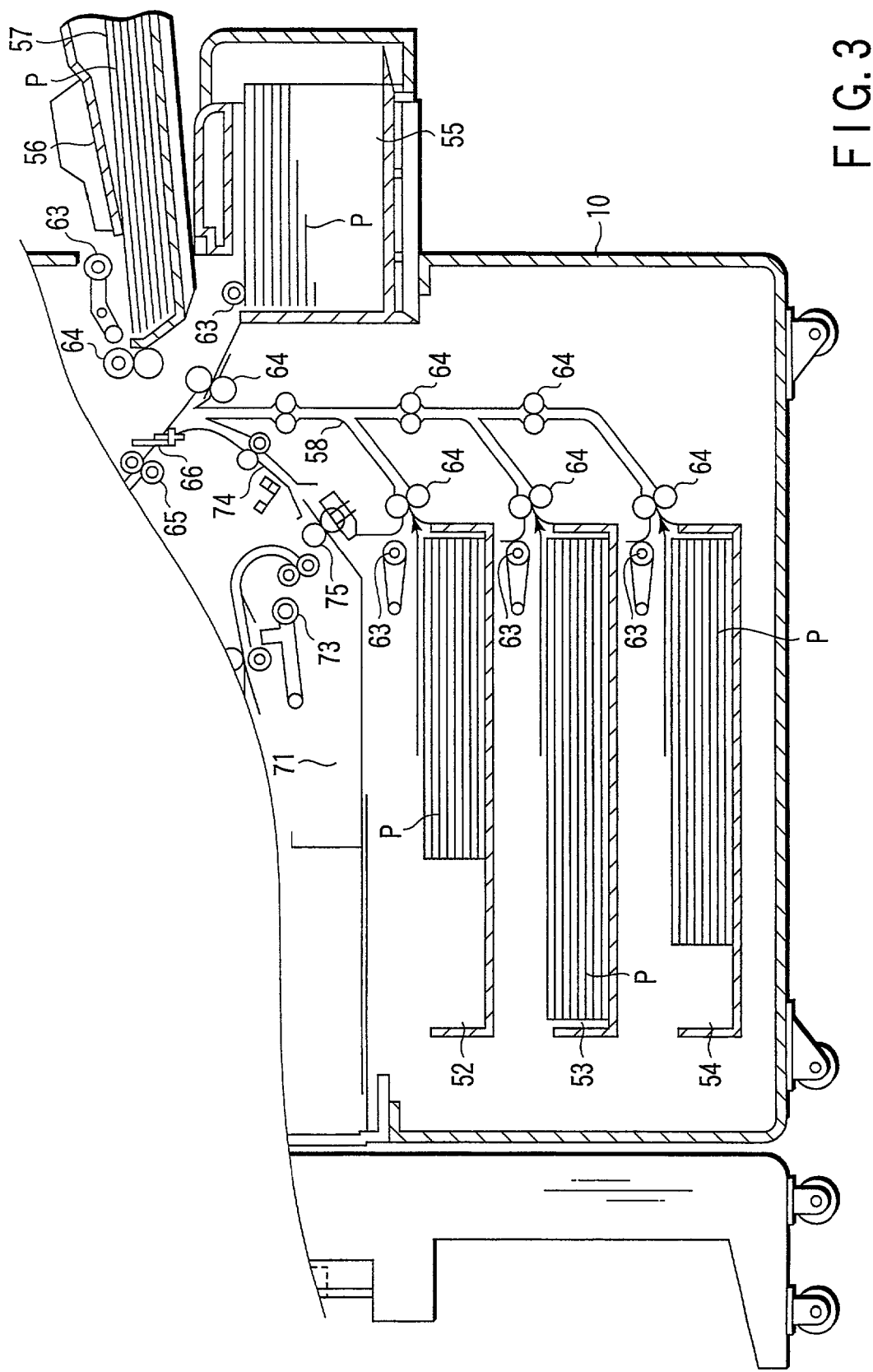

FIG. 3 is a view showing a structural example of the internal structure of the digital copying machine (e.g., a multifunction-type copying machine, and a composite-type image forming device).

At an upper part of the device body 10, an automatic document feeder (hereinafter abbreviated as an ADF) 17, which serves also as a document cover and automatically feeds sheet-like originals one after another, is provided to be freely opened/closed. Provided at a front part of the upper surface of the device body 10 is an operation panel 90 comprising various kinds of operation keys and display devices for instructing copy conditions and start of copying. This operation panel 90 will be explained in details later.

Provided in the right side of the device body 10 are a paper feed cassette 57 with a small capacity capable of containing papers, and a cassette 55 having a large capacity capable of containing papers. Also, the paper feed cassette 57 comprises a manual tray 56 for manually feeding papers.

Paper feed cassettes 12, 53, and 54 are detachably provided at a lower part of the device body 10. Papers of one same size are contained in these cassettes, oriented in lateral and longitudinal directions, so that papers can be selected upon necessity. Provided in the left side of the device body 10, a finisher 80 for receiving copied papers.

Below the operation panel 90 on the front surface of the device body 10 below, there is provided an insertion port (not shown) for inserting a magneto-optical disk as a storage medium for storing image data and the like, and a magneto-optical disk device is provided inside the body.

Provided on the back surface of the device body 10 are a parallel port (not shown), a serial port (not shown), a SCSI (not shown), and the like. The parallel port connects the device with an external device such as a PC (personal computer) or the like, when the device operates as a printer. The serial port connects the device with an external device such as a PC (personal computer) in order to read internal management information of the device and to set functions of the device during maintenance of the device. The SCSI performs command/data communication between the device and an external printer controller (not shown).

In the device body 10, there are provided a scanner part 11 as an obtaining means for obtaining image data to realize the copying function and the facsimile function, and a printer part 12 as an image forming means.

Provided on the upper surface of the device body 10 are a document mount table 13 made of transparent glass where a read target, i.e., an original document D is set, and an ADF 17 which automatically feeds the document onto the document mount table 13. This ADF 17 is provided to be openable/closable with respect to the document mount table 13 and also functions as a document presser.

The ADF 17 comprises a document tray 8 where the original document D is set, an empty sensor 9 for detecting presence or absence of an original document, a pickup roller 14 for picking up original documents one after another from the document ray, a paper feed roller 15 for feeding the picked-up original document, a pair of aligning rollers 16 for aligning the top end of the original document, an aligning sensor (not shown) provided in the upstream side of the pair of aligning rollers 16 to detect arrival of the original document, a size sensor (not shown) for detecting the size of the original document D, and a conveyer belt 18 provided so as to cover substantially the entire of the document mount table 13. Further, a plurality of sheets of an original document are picked up sequentially in the order from the lowermost page of the original document, i.e., from the last page thereof. The last page is aligned by the pair of aligning rollers 16 and is thereafter conveyed to a predetermined position of the document mount table 13 by the conveyer belt 18.

In the ADF 17, a reversal roller 20, a non-reversal sensor 21, a flapper 22, and a paper feed-out roller 23 are provided at an end part in the side opposite to the pair of aligning rollers 16 with the conveyer belt 18 interposed therebetween. A sheet of the original document D from which image information has been read by the scanner part 11 described later is fed out from above the document mount table 13, and is discharged onto the document feed-out part 24 on the upper surface of the ADF 17.

Also, in case of reading the back surface of an original document D, the flapper 22 is switched over so that the original document D is reversed by the reversal roller 20 and is then fed to a predetermined position on the document mount table 13 again by the conveyer belt 18.

The ADF 17 also comprises a paper feed motor for driving the pickup roller 14, paper feed roller 15, and pair of aligning rollers 16, and a conveyer motor for driving the conveyer belt 18, reversal roller 20, and paper feed-out roller 23.

The scanner part 11 provided in the device body 10 includes a light source 25 such as a fluorescent light or the like for illuminating the original document D set on the document mount table 13, and a first mirror 26 for deflecting reflection light from the original document D in a predetermined direction. The light source 25 and the first mirror 26 are attached to a first carriage 27 provided below the document mount table 13. Provided on the first carriage 27 is a size sensor 28 for detecting the size of an original document set on the document mount table 13. The first carriage 27 is set on the document mount table 13 such that the carriage is movable in parallel with the document mount table 13, and is reciprocally moved below the document mount table 13 by a drive motor through a toothed belt or the like not shown.

Also, a second carriage 29 which is movable in parallel with the document mount table is provided below the document mount table 13. Attached to the second carriage 29 are second and third mirrors 30 and 31 for deflecting reflection light from the original document D deflected by the first mirror 26, such that these mirrors 30 and 31 are set perpendicular to each other. The second carriage 29 is moved as a slavery to the first carriage 27 by a toothed belt or the like for driving the first carriage 27, and is also moved in parallel along the document mount table 13 at a half speed of the first carriage.

Below the document mount table 13, there are provided an imaging lens 32 for converging reflection light from the third mirror 31 on the second carriage 29, and a CCD sensor 34 for receiving and photoelectrically converting the reflection light converged by the focus lens. The imaging lens 32 is provided in the place including the light axis of light deflected by the third mirror 31 such that the imaging lens is movable by a drive mechanism. The imaging lens itself moves thereby converging the reflection light into an image of a desired magnification. Further, the CCD sensor 34 photoelectrically converting the entering reflection light and outputs an electric signal corresponding to an original document D.

Meanwhile, the printer part 12 comprises a laser exposure device 40 which operates as an exposure means. The laser exposure device 40 comprises a semiconductor laser 41 as a light source, a polygon mirror 36 as a scanning member for deflecting sequentially laser light emitted from the semiconductor laser 41, a polygon motor 37 as a scanning motor for rotating and driving the polygon mirror 36 at a predetermined rotation speed described later, and an optical system 42 for guiding the laser light from the polygon mirror 36 to photosensitive drums 44*a* to 44*d*. This kind of laser exposure device 40 is fixed to and supported by a support frame (not shown) of the device body 10.

The semiconductor laser 41 is controlled to be turned on/off in accordance with image information of the original document D read by the scanner part 11. This laser light is oriented to each of photosensitive drums 44*a* to 44*d* through the polygon mirror 36 and the optical system 42, thereby to scan the peripheral surfaces of the photosensitive drums 44*a* to 44*d*, so that electrostatic latent images are respectively formed on the photosensitive drums 44*a* to 44*d*.

The image forming part 12 has freely rotatable photosensitive drums 44*a* to 44*d* as image carriers provided at the substantial center of the device body 10, and desired electrostatic latent images are respectively formed on circumferential surfaces of the photosensitive drums 44a to 44d, exposed by laser light from the laser exposure device 40.

Respectively provided around the photosensitive drums 44a to 44d are electrification chargers 45, . . . for charging the circumferential surfaces of the photosensitive drums 44a to 44d, developing devices 46, . . . for supplying toner as a developing agent for electrostatic latent images formed on the circumferential surfaces of the photosensitive drums 44a to 44d thereby to develop the images at a desired image density, separation chargers 47, . . . for separating a transfer material supplied from the paper feed cassettes 52, 53, 54, 55, or 57, i.e., a copy paper P to which the images are to be transferred, transfer chargers 48 for toner images formed on the photosensitive drums 44a to 44d to the paper P, separation nails (not shown) for peeling the copy paper from the circumferential surfaces of the photosensitive drums 44a to 44d, cleaning devices 50, . . . for cleaning toner remaining on the circumferential surfaces of the photosensitive drums 44a to 44d, and dischargers for discharging the circumferential surfaces of the photosensitive drums 44a to 44d.

The paper feed cassettes 52, 53, and 54 each of which can be drawn out of the device body 10 are provided and layered at a lower part of the device body 10. Copy papers of different sizes are respectively stocked in the cassettes 52, 53, and 54. In the side of these cassettes 52, 53, and 54, a paper feed cassette 55 of a large capacity is provided, and copy papers of a size frequently used, e.g., about 3000 sheets of A4 size, are contained in the paper feed cassette 55 of the large capacity. A paper feed cassette 57 which serves also as a manual-insertion tray 56 is equipped detachably above the large capacity paper feed cassette 55.

In the device body 10, conveyer paths 58 which extends from the cassettes through a transfer part positioned between the photosensitive drums 44a to 44d and the transfer charger 48 is formed, and a fixing device 60 is provided at a tail end of the conveyer paths. A discharge port 61 is formed in the side wall of the device body opposed to the fixing device 60, and a finisher 80 is attached to the discharge port 61.

Pickup rollers 63 each of which picks up papers one after another from cassettes are respectively provided near the paper feed cassettes 52, 53, 54, 55, and 57. In addition, a large number of pairs of paper feed rollers 64 for conveying copy papers P picked up by the pickup rollers 63 through the conveyer paths are provided for the conveyer paths 58.

On the conveyer paths 58, pairs of resist rollers 65 are provided in the upstream side of the photosensitive drums 44a to 44d. The pairs of resist rollers 65 correct inclination of the picked-up copy paper P, align the top ends of toner images with the top end of the copy paper P, and supply it to the transfer part at the same speed of the speed at which the circumferential surfaces of the photosensitive drums 44a to 44d move. In front of the pairs of resist rollers 65, i.e., in the side of the paper feed roller 64, there is provided an aligning sensor 66 for detecting arrival of a copy paper P.

Each of the copy papers P which have been picked up one after another from the cassettes by the pickup rollers 63 is fed to a pair of resist rollers 65 by the pairs of paper feed rollers 64. The top end of each copy paper P is aligned by the pair of resist rollers 65 and is thereafter fed to the transfer part by the conveyer belt 67.

At the transfer part, developer images formed on the photosensitive drums 44a to 44d, i.e., toner images are transferred to the paper P by the transfer chargers 48. The copy paper P to which the toner images have been transferred are peeled from the circumferential surfaces of the photosensitive drums 44a to 44d by operation of the separation chargers 47 and separation nails (not shown) and are conveyed to the fixing device 60 by the conveyer belt 67 forming part of the conveyer paths 58. Further, the developer images are melted and fixed to the copy paper P by the fixing device 60, and thereafter, the copy paper P is let pass through the discharge port 61 to the discharge tray 81 of the finisher 80 by the pair of paper feed rollers 68 and the pair of paper feed-out rollers 69.

An automatic double-siding device (ADD) 70 for reversing each copy paper P which has passed through the fixing device 60 and feeding it again to the pair of resist rollers 65 is provided below the conveyer path 58. The automatic double-siding device 70 comprises a temporary stock part 71 for temporarily stocking copy papers P, a reverse path 72 branched from the conveyer paths 58 for reversing each copy paper P which has passed through the fixing device 60 and for guiding it to the temporary stock part 71, a pickup roller 73 for picking up one after another of the copy papers P stocked in the temporary stock part, and a paper feed roller 75 for feeding the picked-up paper through a conveyer path 74 to the pair of resist rollers 65. Also, a distribution gate 76 for selectively distributing copy papers P to the discharge port 61 or the reverse path 72 is provided at a branch part between the conveyer path 58 and the reverse path 72.

In case of performing double-sided copying, each copy paper P which has passed through the fixing device 60 is introduced to the reverse path 72 by the distribution gate 76, and is temporarily stocked in the temporary stock part 71, kept reversed. Thereafter, each copy paper P is fed to the pair of resist rollers 65 through the conveyer path 74 by the pickup roller 73 and the pair of paper feed rollers 75. Further, each copy paper P is aligned by the pair of resist rollers 65 and thereafter fed again to the transfer part where toner images are transferred to the back surface of the copy paper P. Thereafter, each copy paper is discharged to the paper feed-out tray 81 of the finisher 80 through the conveyer path 58, the fixing device 60, and the paper feed-out roller 69.

Also, each paper can be discharged with its printed side oriented downwards by using this automatic double-siding device 70. That is, in the same manner as that of performing double-side copying, images are transferred and fixed to the surface of a paper, which is then temporarily stocked into the temporary stock part 71. The paper is then passed through the conveyer path 74 by the pickup roller 73 and the pair of paper feed rollers 75, and is aligned by the pair of resist rollers 265. Thereafter, the paper is discharged to the paper feed-out tray 81 through the conveyer path 58, fixing device 60, and discharge 69.

Figure 4:
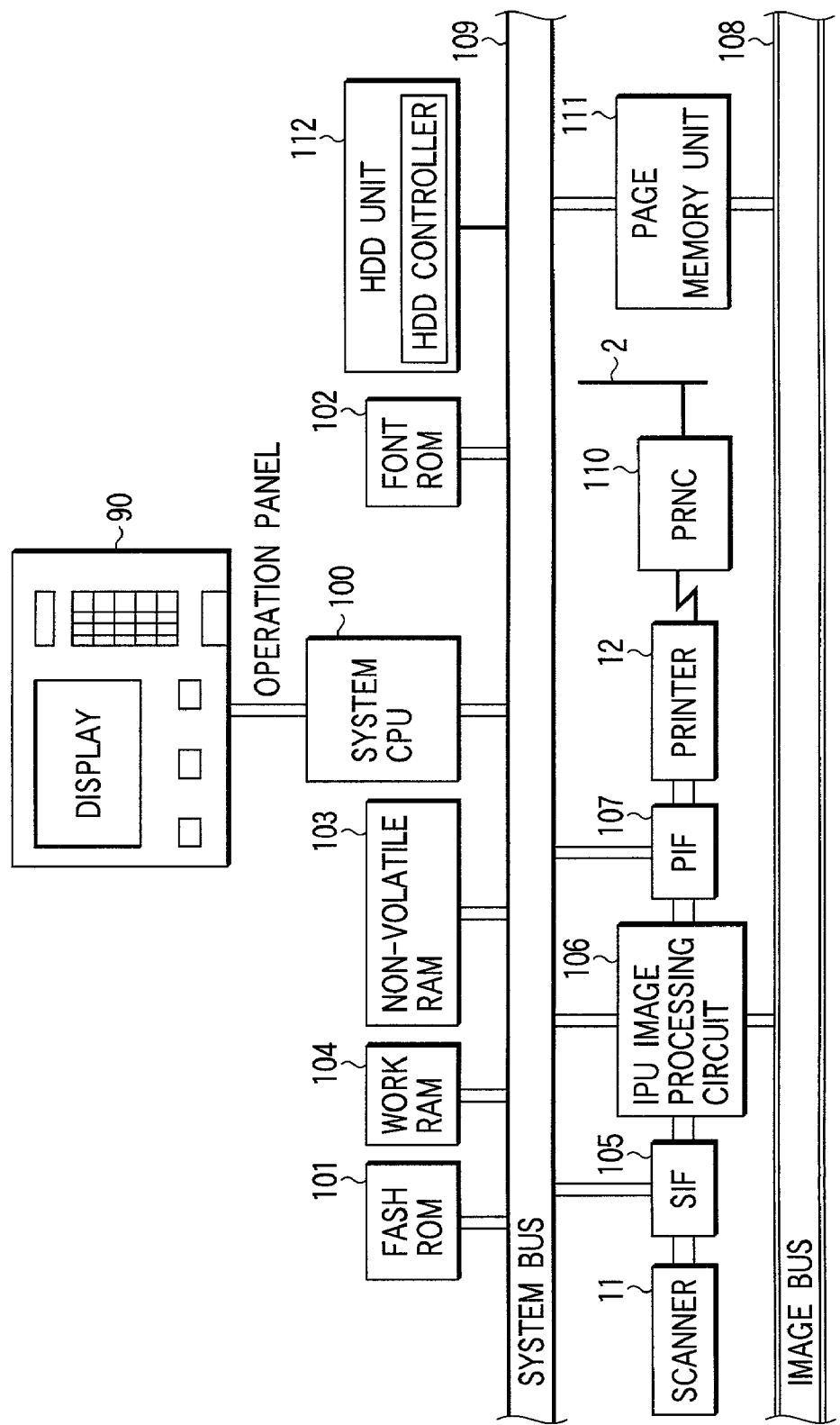
FIG. 4 is a block diagram showing the system structure of the color image forming device.

FIG. 4 is a block diagram showing the structure of the control system of the digital copying machine described above.

This digital copying machine is constructed by a system CPU 100, a flash ROM (for program and data storage) 101, a font ROM 102, a non-volatile RAM (NVRAM) 103, a DRAM (for work area and data storage) 104, a scanner interface (SIF) 105, an image processing unit (IPU) 106, a printer interface (PIF) 107, the scanner part 11 described previously, the printer part 12 described previously, an image bus 108, a system bus 109, a page memory unit 111, and a HDD unit 112.

The printer part 12 describe above is connected to a printer controller (PRNC) 110 through a channel, and the printer controller 110 is connected to the network (LAN) 2.

The system CPU 100 serves to control the entire digital copying machine and controls respective functions in accordance with instructions through the operation panel 90, signals inputted through communication channels, and signals inputted through various external interfaces, in this case.

The scanner interface (SIF) 105 is an interface for receiving image data from the scanner part 11.

The image processing unit (IPU) 106 is an image processing part for performing image quality processing, magnification/reduction processing and pixel suppression processing in compliance with the printer part 12, and image edit processing such as whiting of a specified area depending on detection of a marker.

Each of these devices is connected through the image bus 108, and control signals between the system CPU 100 and each device are exchange at a high speed through a system bus 109.

This image bus 108 is a bus which is provided uniquely for the present device operating as a copying machine. In order to guarantee real-time operation of the copying machine, operation of receiving image data inputted from the scanner part 11 through the SIF 105, operation of performing high-image quality processing, magnification/reduction processing, and various edit processing by the IPU 106, and operation of print-outputting by the PIF 107 are carried out in parallel (called basic copying). Among boards connected to the image bus 108, processing boards unnecessary for the operations on time are brought into bypass status.

Also, the printer controller (PRNC) 110 has an interface to the printer part 12 which controls the image-forming function during copying and printer operation, and is also connected to the network 2 described above through a device such as a NIC (Network Interface Card) or the like. The controller 110 receives print data through the network 2 from a device such as an external PC or the like, buffers the data, and performs protocol control, transfer control, data compression control, and data expansion control to transfer data to the printer part 12.

The page memory unit 111 is constructed by a page buffer for storing temporarily image data inputted from the scanner part 11 and image data read from the HDD unit 112 during printing, a compression/expansion circuit for compressing or expanding image data, various ASICs and rotation buffers for performing rotation processing on image data at 90°, 180°, 270° and the like.

FIG. 5 shows the structure of the operation panel 90. As shown in the figure, the operation panel 90 is provided with a touch panel display 91, a start key 92, a stop key 93, a clear key 94, ten-keys 95, a key 96 for selecting document-size/cassette, LEDs97 for indicating the selected document-size/cassette, a copy magnification setting key 98, an operation mode selection key 99 for selecting the operation mode such as FAX or printer, and the like. Also, the ten-keys 95 are arranged in the same layout as that of buttons of the push-phone.

For example, in case of making five copies, the menu on the touch-panel display 91 is switched to copying, and desired processing (double-sided copying or the like) is selected. Thereafter, the key "5" of the ten-keys 95 is pressed. This number is then displayed in a specific area on the touch panel display 91. After a user checks it, the user sets an original document and pushes the start key 92. Copying operation is then started.

Figure 6:
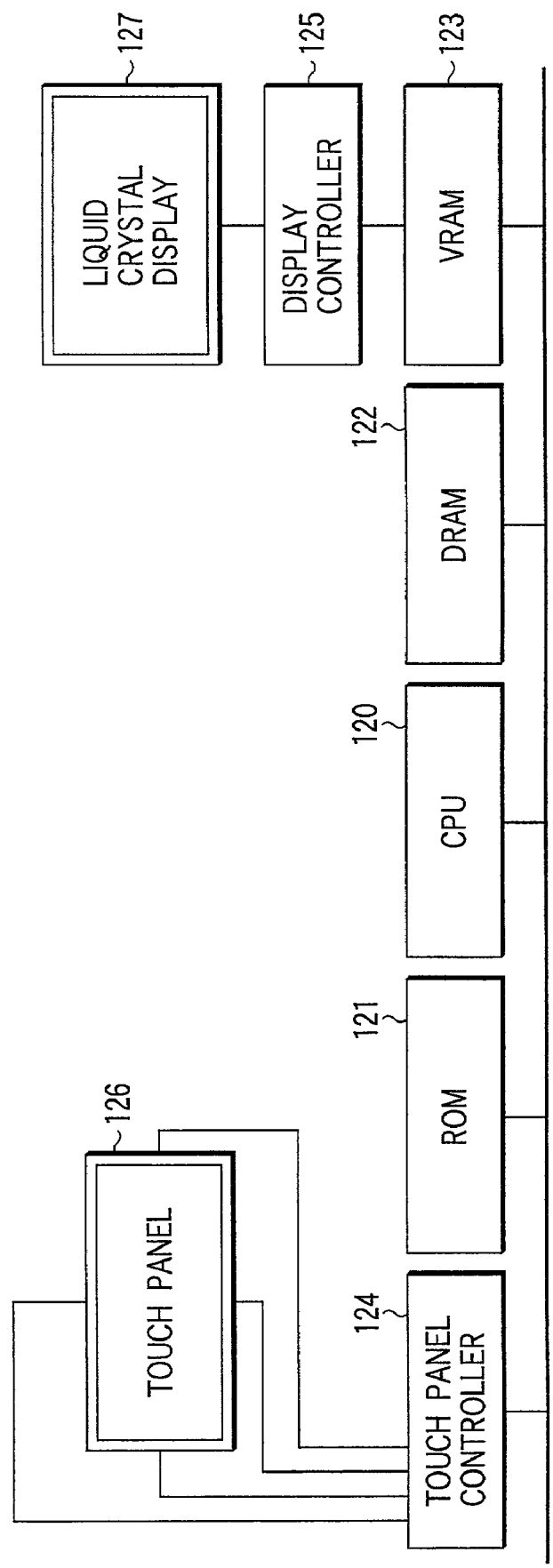
FIG. 6 is a block diagram showing the structure of a touch panel display in the operation panel.

FIG. 6 is a block diagram showing the structure of the control system of the touch panel display 91 described above.

The touch-panel display 91 is constructed by a CPU 120, a ROM (for program storage and data storage) 121, a DRAM (for operation and data storage) 122 as a work RAM, a VRAM 123 as a display RAM, a touch panel controller 124, and a display controller 125.

The CPU 120 controls the entire touch panel display 91. The touch panel display 91 is constructed by layering the touch panel 126 on the liquid crystal display 127. On the touch panel 126, a transparent resistance material is uniformly applied and a group of transparent electrodes are arranged thereon in parallel at predetermined intervals in the X and Y directions.

In the touch panel 126, a voltage is sequentially applied to transparent electrodes of the X and Y directions in constant directions, under control of the touch panel controller 124. Operation for instructing a position on the touch panel 126 is carried out by a specialized conductive pen or a finger. The touch panel controller 124 monitors the resistance values between the electrodes in the X and Y directions, and detects a position where a resistance value is locally lowered, by means of calculation from the resistance values between the electrodes.

In addition, the liquid crystal display 127 is connected with a display controller 125 for driving display thereof, and a display RAM (VRAM) 123 for storing display data in units of display pixels.

In the touch panel display 91 constructed as described above, position data obtained by the touch panel controller 124 is read by the CPU 120 and processing corresponding to this position data is executed also by the CPU 120. For example, in case of input by hand-writing, data on the VRAM 123 corresponding to the position specified on the touch panel 126 is reversed from non-displayed status into displayed status. The touch panel display 91 can be used for wide applications, e.g., input of operation parameters by selection through keyboard display displayed on the liquid crystal display 127 and various groups of setting buttons.

Figure 7:
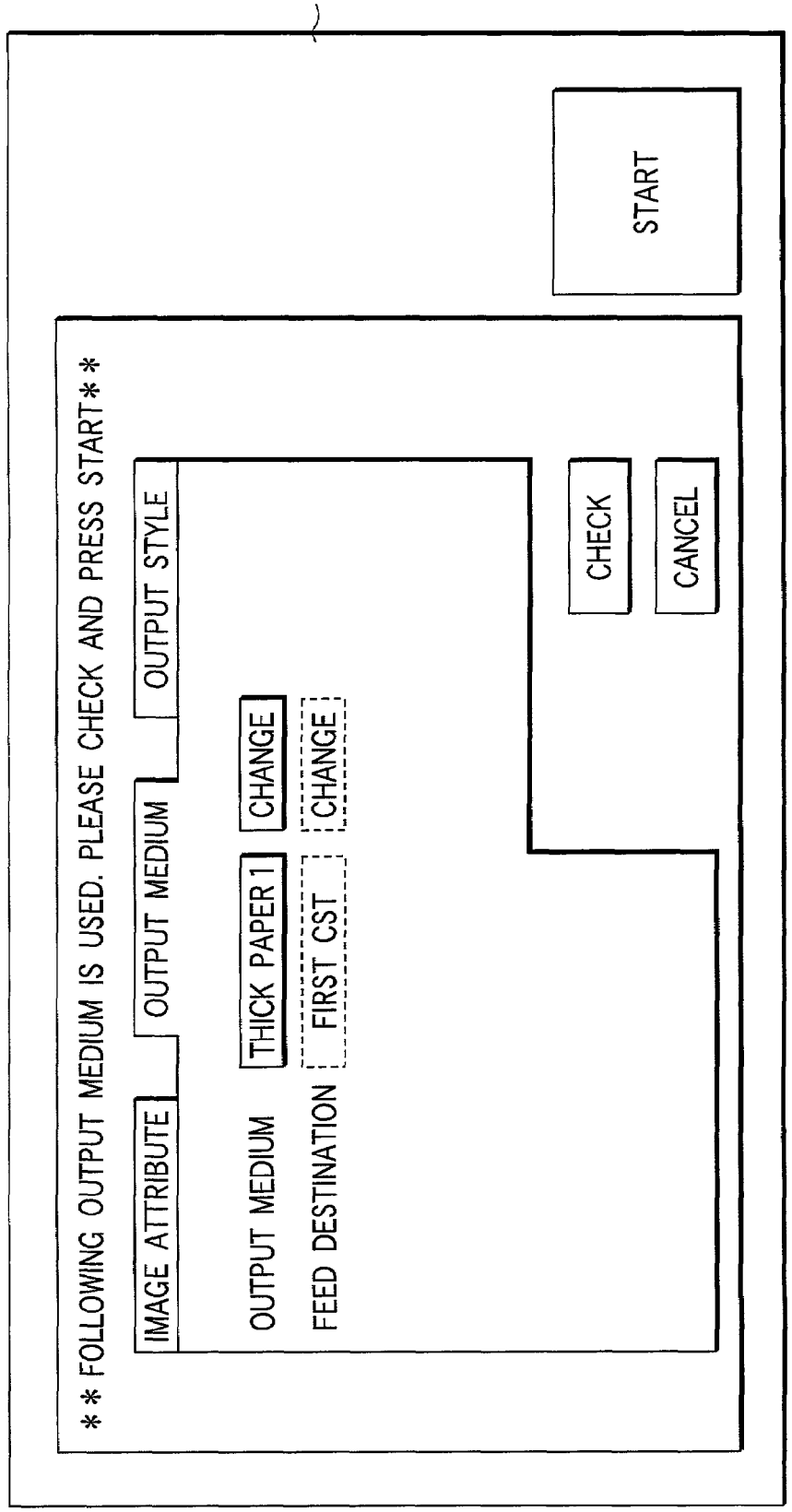
Figure 9:
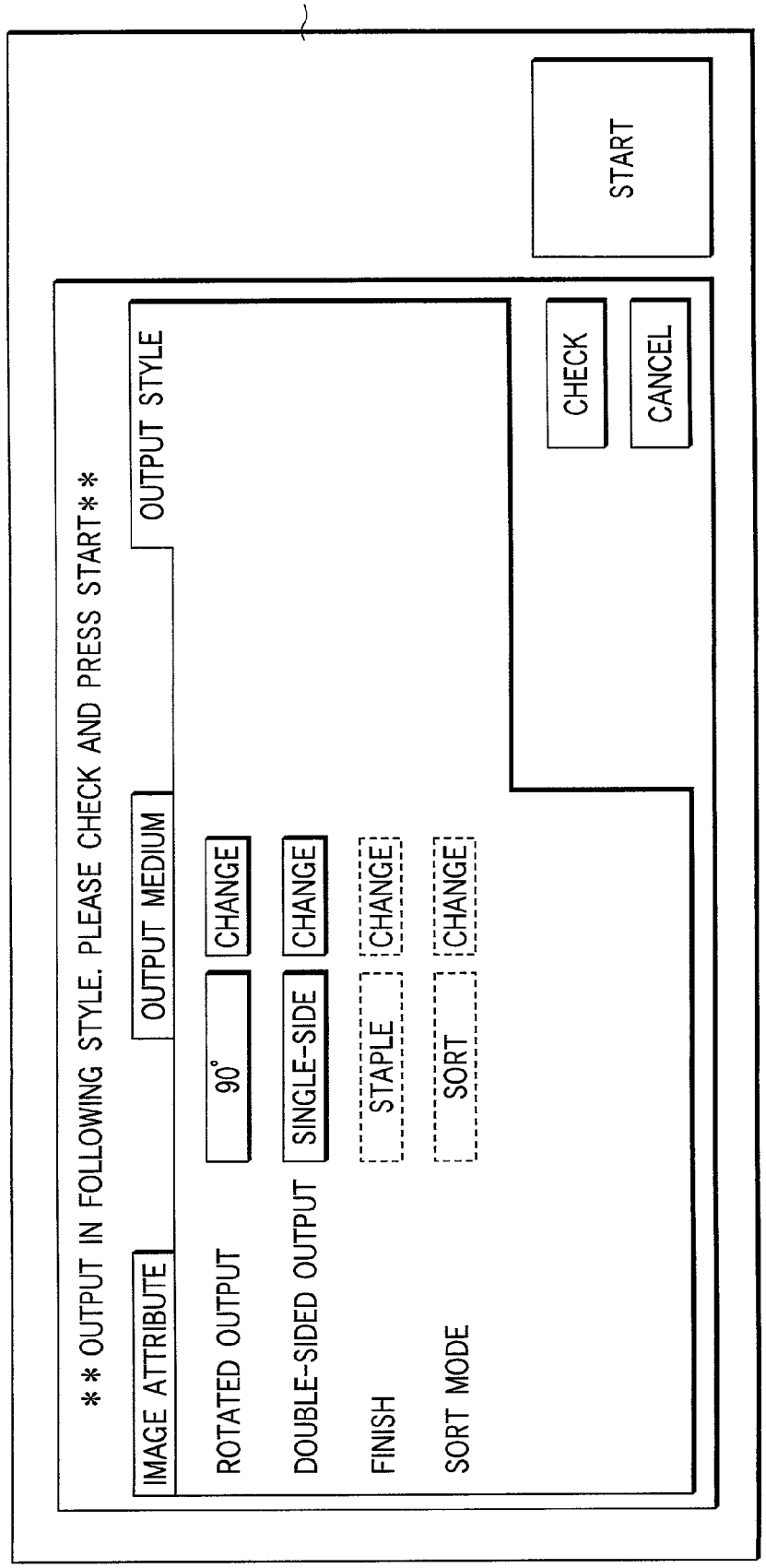

FIGS. 7 to 9 are views showing examples of parameter confirmation screens displayed in the side of slave devices (1*b* to 1*f*) through a procedure shown in FIG. 38 and explained later, with respect to operation conditions specified by the master device (1*a*).

As shown in these figures, parameters are displayed in form of lists, classified into image attribute information (read condition) as an operation condition, output medium information (image forming condition), and output style information (image forming condition). Parameters that can be changed are displayed in form of icons and are allowed to change. Parameters that cannot be changed are displayed with the icon frames indicated as dot lines thereby to clarify the contents of the parameters.

The image attribute information is a condition concerning document reading and specifies density information, document type information such as photograph document, text document, or the like, and adjustment value information used when correcting gammas.

Output medium information is a condition which specifies the type of a copy paper, such as a thick paper, a color-specialized paper, a normal paper, OHP, or the like.

Output style information is a condition for printing output and specifies printing on one surface of the copy paper, printing on both surfaces of the copy paper, rotation of image data, reversal of image data, regular or reverse order of plural pages of image data, and the like.

Displayed as the image attribute information are the input method, color mode, document mode, density adjustment, document size, magnification, color adjustment, edit, and the like, as shown in FIG. 8. In this case, with respect to the input method, "ADF" and "change" are displayed with continuous lines, indicating that it is changeable. With respect to the color mode, "full-color" and "change" are displayed with continuous lines, indicating that its is changeable. With respect to the document mode, "photograph" and "change" are displayed with continuous lines, indicating that it is changeable. With respect to the density adjustment, "automatic density" and "change" are displayed with continuous lines, indicating that it is changeable. With respect to the document size, "A4" and "change" are displayed with continuous lines, indicating that it is changeable. With respect to the magnification, "71%" and "change" are displayed with continuous lines, indicating that it is changeable. With respect to the color adjustment, "no adjustment" and "change" are displayed with continuous lines, indicating that it is changeable. With respect to the edit, "black/white reversal" and "change" are displayed with continuous lines, indicating that it is changeable. Also, with respect to the edit, "no instruction" and "change" are displayed with continuous lines, indicating that it is changeable. Also, with respect to the edit, "binding margin" and "change" are displayed with broken lines, indicating that it is not changeable.

Displayed as the output medium information are the type of output medium and the paper feed source, as shown in FIG. 7. In this case, with respect to the output medium, "thick paper 1" and "change" are displayed with continuous lines, indicating that it is changeable. With respect to the paper feed source, "first cassette" and "change" are displayed with broken lines, indicating that it is not changeable.

Displayed as the output style information are the rotation output, double-side output, finish, and sort mode, as shown in FIG. 9. In this case, with respect to the rotation output, "90°" and "change" are displayed with continuous lines, indicating that it is changeable. With respect to the double-side output, "single side" and "change" are displayed with continuous lines, indicating that it is changeable. With respect to the finish, "staple" and "change" are displayed with broken lines, indicating that it is not changeable. With respect to the sort mode, "sort" and "change" are displayed with broken lines, indicating that it is not changeable.

Figure 10:
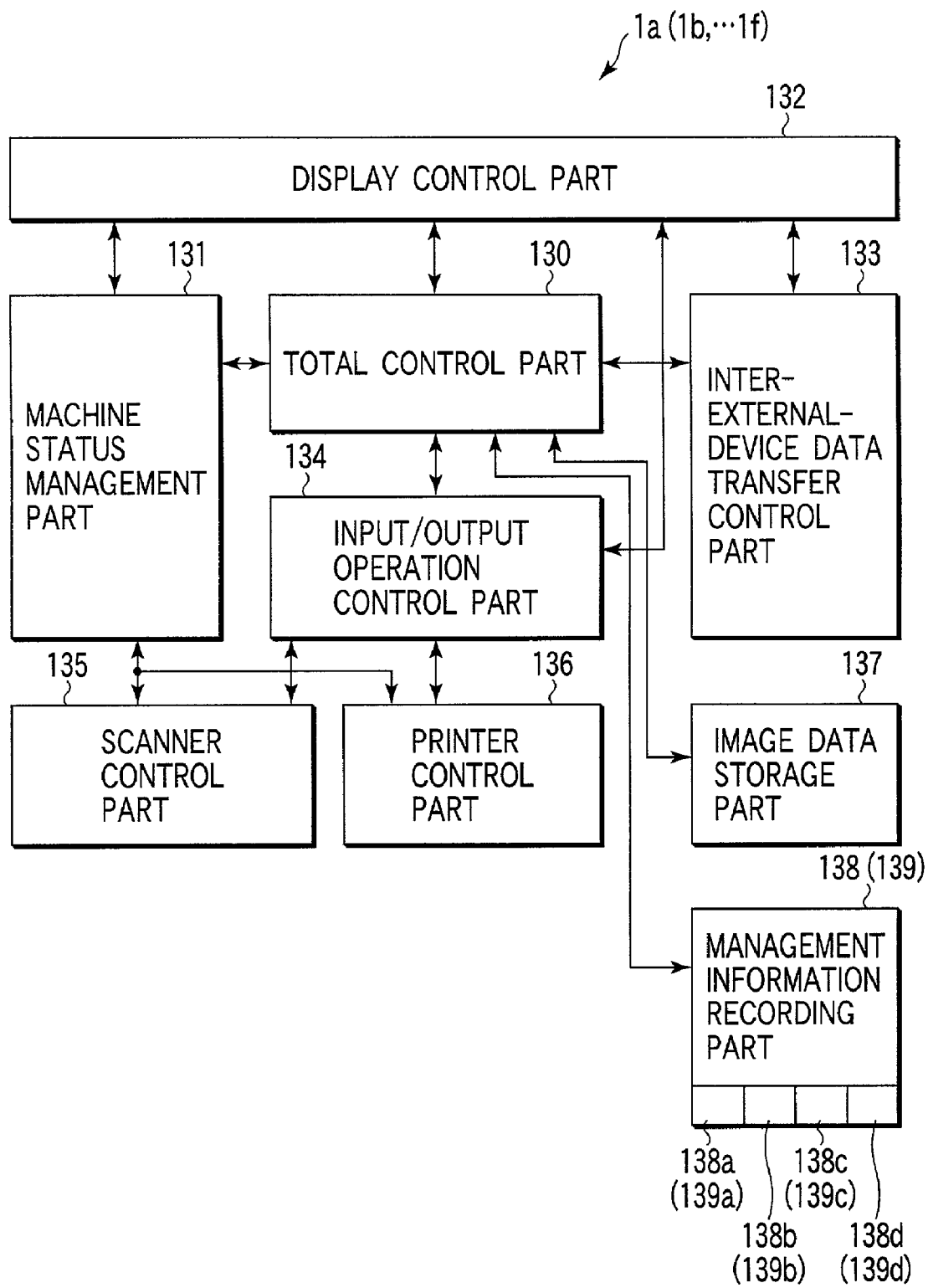
FIG. 10 is a diagram showing the structure of functional modules which construct an input device.

FIG. 10 shows a functional module structure constructing the input device of the present invention.

The digital copying machine is constructed by a total control part 130, a machine condition management part 131, a display control part 132, an inter-external-device data transfer control part 133 for data transfer between external devices, input/output operation control part 134, a scanner control part 135, a printer control part 136, an image data storage part 137, and a management information recording part 138.

In this figure, the scanner control part 135 is constructed by image processing units for pre-processing, such as a scanner part 11, a scanner control ASIC, scanner control firmware for performing scanner drive control, ADF (Auto Document Feeder) control, and the like, and an image processing unit for pre-processing such as shading processing or the like.

The printer control part 136 is constructed by a printer part 12, a printer control ASIC, an image processing ASIC for the output side, printer operation control firmware for performing printer control, paper feed control, and the like during printing, and image processing firmware for the printer side. The printer control part 136 has an interface to the printer controller 110 and performs command communication for control commands and status, and communication control of print data. Also, the part 136 performs control for executing print output of both the image data inputted from the scanner part 11 and image data transmitted from the printer controller 110.

Each of the scanner control part 135 and the printer control part 136 has a control CPU and realizes high-speed control. These parts performs command-status communication with the system CPU 100 shown in FIG. 4 and controls display and synchronous operation of the scanner part 11 and printer part 12. Thus, copying operation and print output operation are realized as a whole of the device.

The input/output operation control part 134 includes an image processing unit 106 and also has interfaces to the scanner control part 135 and the printer control part 136. Using an operation start command received from the total control part 130 as a trigger, the input/output operation control part 134 performs drive timing control of the scanner part 11 and the printer part 12 and simultaneously calculates and sets image processing parameters in the image processing unit 106, thereby to control the copying function. The timing control means, for example, drive timing of the ADF 17, scanner drive timing, decoration processing of an image developed on a memory, instruction of print start timing, instruction of input start timing of a next document, and the like. In addition, hold/release commands concerning printer resources received by the display control part 132 are notified to the printer control part 136.

The display control part 132 is constructed by the operation panel 90 of the present device as explained in FIGS. 5 and 6, and display control software for controlling the panel. In this case, operation information of the operation panel 90 is informed to the total control part 130, and various conditional changes occurring in the device are received as information from the machine condition management part 131 and are reflected on display. In addition, information concerning results and process of processing, such as copying results, the number of copy sets, size information, and the like, is received from the total control part 130 and is reflected also on display. This reflection method means specifically lighting of LEDs on the operation panel 90 and display of messages on the LCD 127.

The total control part 130 further monitors continuously the operating conditions of the entire device and executes exclusive control of resources commonly shared by a plurality of functions, e.g., by the scanner part 11 and the printer part 12, priority operation between copying and print data printing, screen switching operation, and the like. For example, the total control part 130 inhibits print data printing for a predetermined time period, in case where a plurality of screens are being operated and in case where copying is rendered executable with priority. Inversely, upon starting of print data printing, the total control part 130 switches the screen to display which indicates "printing" and restricts execution of copying. In addition, the total control part 130 performs time control of timer monitoring or the like, and also performs appropriately control of switching the menu with respect to the display control part 132.

The machine condition management part 131 monitors the condition of the machine notified from the scanner control part 135 and the printer control part 136, for example, the part 131 monitors information concerning paper jamming, jam release, open/close of the front cover, and the like, and notifies the total control part 130 and the display control part 132 of it thereby to reflect the error status on display or reflect it on determination of ability or inability to execute copying operation.

In addition, machine recovery operation after releasing an error or ending a job is managed by instructions from the total control part 130. In this case, the recovery operation means preparatory operation for carrying out next copying, e.g., initialization of an indicator position of the scanner part 11, warming-up operation of the heat roller part, and the like.

The inter-external-device data transfer control part 133 includes a LAN I/F includes a LAN I/F part and is constructed by a scanner part 11 and a printer part 12 connected through LAN or communication control software for control signals and image data to make communication with a digital copying machine. The LAN I/F part is constructed by a NIC (Network Interface Card), a buffer memory, and the like.

The management information recording part 138 of the master device is constructed by an image file management table 138*a*, a copy attribute/style/medium information table 138*b*, a device management table 138*c*, and a print device management table 138*d*.

The management information recording part 139 of the slave device is constructed by an input operation management table 139*a*, a copy attribute/style/medium information table 139*b*, a device management table 139*c*, and a print device management table 139*d*.

FIG. 11 shows a conceptual view of image data transferred from a slave device to a master device and managed by the image data storage part 137. Image data transferred from a slave device to a master device is stored into an area fixedly and previously maintained on the image data storage part 137 of the master device. Information such as page numbers, ID numbers, and master/slave described in the figure is managed by the copy attribute/style/medium information table 138*b* shown in FIGS. 13 and 14.

FIG. 11 shows that pages of an inputted image data file are mechanically integrated and are finally treated as on input original document, considering image data as having been inputted in the order of ID numbers assigned to all input devices including the master device. For example, the device assigned with ID: 0 responds to pages up to 31 from the top, and the device assigned with ID: 1 responds to pages next 32 pages thereof, and the device assigned with ID: 2 responds to further next 41 pages, with respect to an input document of 108 pages.

FIGS. 12 to 17 show installation examples of the management information recording part 138 in the master device.

As shown in FIG. 12, page numbers of image data inputted by each input device and operation conditions of copy operation itself are set in the image file management table 138*a*, and a print device is set if a print device is specified.

For example, as shown in FIG. 12, JOBID "0×01", input device information "0×0C", page number (device 0) "0×1F", page number (device 1) "0×20", page number (device 2) "0", page number (device 3) "0×29", page number (device 4) "0", page number (device 5) "0", page number (device 6) "0", page number (device 7) "0", input operation status "inputting", total page "0×68", and output device specification "0×05" are registered.

As shown in FIGS. 13 and 14, operation condition parameters (operation condition information) set for every image forming device and every input device are stored in the copy attribute/style/medium information table 138*b*. With respect to these information items, contents set by the master device are sent to the side of the slave device, as has been explained in the flowcharts shown in FIGS. 28 to 31 and FIGS. 32 to 34, and items are changed in the side of the slave device. Copy attribute information/output medium information/output style information is then sent from the slave device to the master device prior to image data transmission, and is stored into this table. Further, this information is sent to the print device prior to image data transmission when a print device is specified, and is referred to when print output is carried out.

For example, as shown in FIGS. 13 and 14, image attribute information, medium information, and output style information for each input device are registered. The image attribute information is comprised of an input device number, JOBID, file name, page number, document size, magnification, color, black, format such as JPEG or the like, density adjustment, color adjustment, edit, edit, edit, photograph, and mode such as text or the like. Medium information is comprised of a medium such as thick paper, normal paper, or the like, and paper feed source. The output style information is comprised of a rotation output, double-side output, finish, and sort mode. Manual, cassette, or the like is registered as a paper feed source.

For example, as shown in FIGS. 13 and 14, input device number "0×00", JOBID "0×01", file name "1 0 ***.jpg", page number "0×1F", input method "ADF", document size "A4", magnification "71", color or black "color", format "JPEG", density adjustment "automatic density", color adjustment "no adjustment", edit "white-black reverse", edit "biding margin", edit "no instruction", mode "photograph", medium "thick paper", paper feed source "first cassette", rotation output "90°", double-side output "single", finish "staple", and sort mode "sort" are registered.

Figure 23:
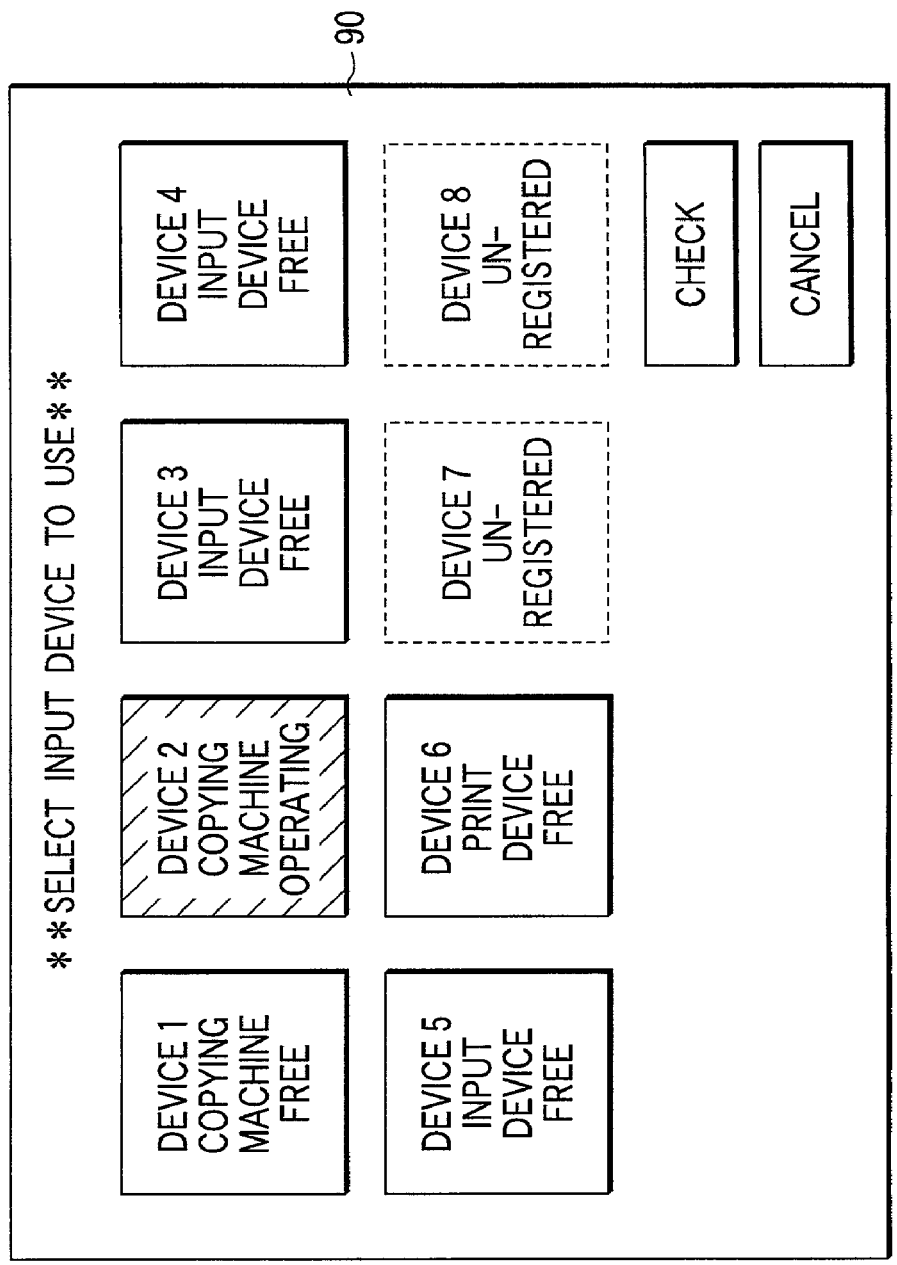
FIGS. 23 and 24 are views showing device status display screens.
Figure 24:
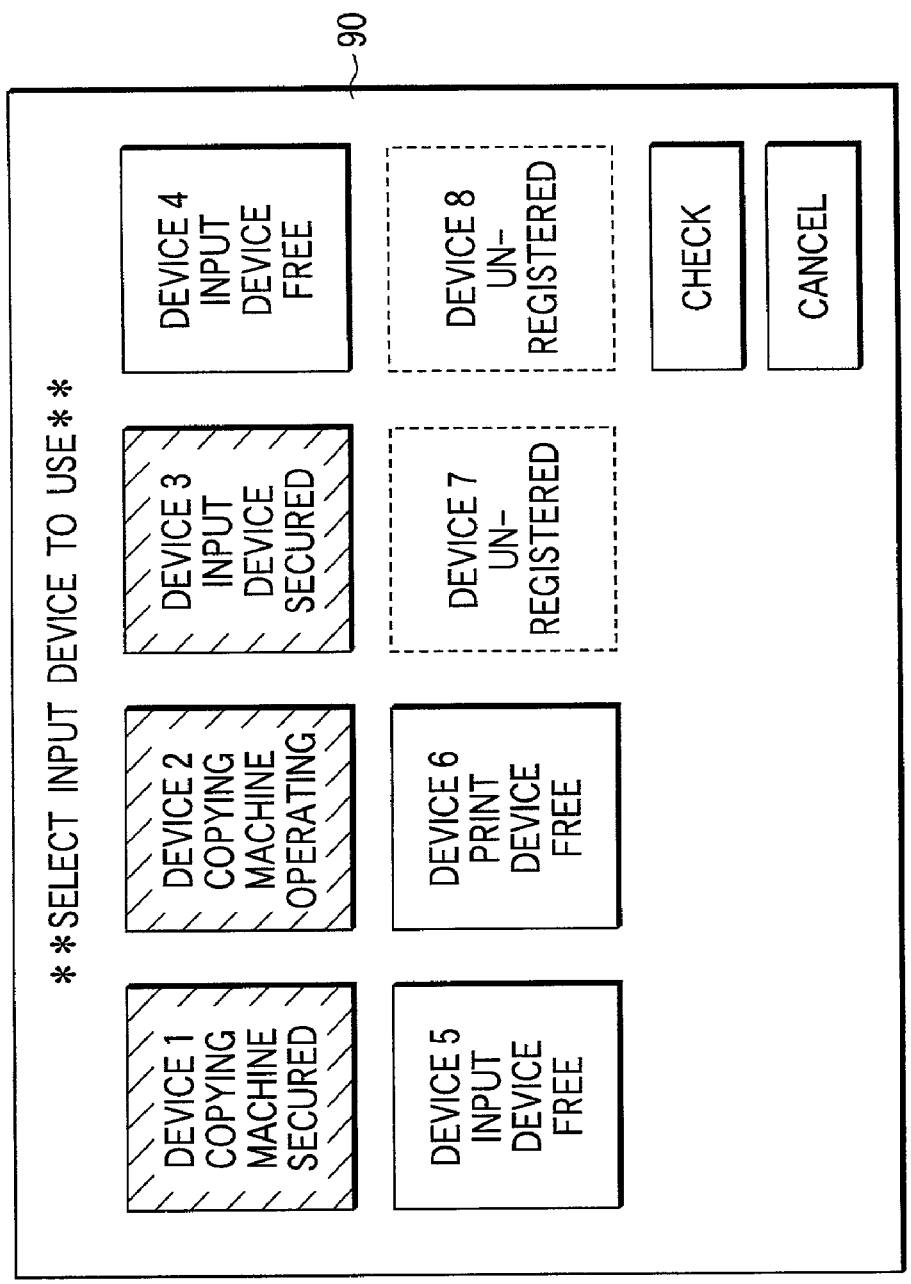

As shown in FIGS. 15 and 16, information of each of image forming devices and input devices connected to a network is stored into the device management table 138*c*. Devices communicate with each other with respect to these information items as initial information when devices start operation, and devices exchange information and store obtained information. Each device broadcast a status change to all devices when the operation status such as operating, waiting, working, machine error, or the like changes. Each device updates received information. In addition, in case of master/slave device information, information concerning the number of inputted pages, or error occurrence, error information or the like is stored. Display of the device status display screen shown in FIG. 23 is updated with reference to information stored in this table.

For example, as shown in FIGS. 15 and 16, input device number, operation status, error number, inputted page number, IP address, PWD, option, memory size, device identification ID, specification of a master/slave device, and specification of an output device are registered for each input device. Input device number "0×00", inputted page number "0×1F", IP address "192.168.*", PWD "***", option "ADF", memory size "3GB", device identification ID "0", and specification of an output device "0×00" are registered. The operation status described above will be "in use", "working", "error status", or the like.

As shown in FIG. 17, performance information and operation status as print device performance information, error status, output medium information, and the like are stored in the print device management table 138*d*. With respect to this information, information which is sent from a print device when a print device is specified is stored.

For example, as shown in FIG. 17, the output device number "0×05", operation status "empty", color performance "full color", error number "0×00", output page number "0×FF", IP address "192.168.*", PWD "***", on/off of double-siding device "ON", on/off of staple "ON", possible/impossible of rotation output "possible", memory capacity "3GB", size of large capacity paper feed cassette "A4", first cassette size "A4R", first cassette medium "NORMAL", second cassette size "A3", second cassette medium "NORMAL", third cassette size "A4", third cassette medium "THICK PAPER", fourth cassette size "B4", fourth cassette medium "NORMAL", manual insertion paper feed size "A4", and manual insertion paper feed medium "COLOR-ONLY PAPER" are registered.

FIGS. 18 to 21 show an installation example of a management information recording part 139 in a slave device.

As shown in FIG. 18, JOBID, master device information, inputted page number, operation status, error type, slave device instruction, and master device instruction are registered in the input operation management table 139a.

For example, as shown in FIG. 18, the JOBID "0×01", master device information "0×00", inputted page number "0×0F", operation status "IN USE", error type "0×FF", slave device instruction "0×01", and master device instruction "0×00" are registered.

Operation condition parameters set for every device are stored in the copy attribute/style/medium information table 139b, as shown in FIG. 19. The contents set by the master device are sent to the side of slave devices, and setting items are changed in the side of the slave devices.

For example, as shown in FIG. 19, image attribute information, medium information, and output style information are registered. The image attribute information is constructed by input device number, JOBID, file name, page number, original document size, magnification, color or black, format such as JPEG or the like, density adjustment, color adjustment, edit, edit, edit, and mode such as text, photograph, or the like. The medium information is constructed by a medium such as thick paper, normal paper, or the like, and a paper feed source. The output style information is constructed by rotation output, double-side output, and sort mode. Manual insertion, cassette, or the like is registered as a paper feed source.

Input device number "0×00", JOBID "0×01", file name "1 0***.jpg", page number "0×01", input method "ADF", original document size "A4", magnification "71", color or black "COLOR", format "JPEG", density adjustment "AUTOMATIC ADJUSTMENT", color adjustment "NO ADJUSTMENT", edit "WHITE/BLACK REVERSAL", edit "BINDING MARGIN", edit "NO INSTRUCTION", mode "PHOTOGRAPH", medium "THICK PAPER", paper feed source "FIRST CASSETTE", rotation output "90°", double-side output "SINGLE", finish "STAPLE", and sort mode "SORT" are registered.

As shown in FIG. 20, information concerning image forming devices and input devices connected to the network is registered in the device management table 139c, like the device management table 138c. Devices communicate with each other with respect to these information items as initial information when devices start operation, and devices exchange information and store obtained information. The same information as that of the device management table 138c described above is registered in the device management table 139c.

As shown in FIG. 21, print device performance information, operating status, error status, output medium information, and the like are stored in the print device management table 139d, like the print device management table 138d. This information is stored as print device information is notified from the master device when specifying a slave device. The same information as that of the print device management table described above is registered in the print device management table 139d.

In the side of a slave device, the parameter confirmation screens as shown in FIGS. 7 to 9 are prepared and displayed, with reference to the information.

FIG. 22 is shows the flow of controls between the master device and slave devices. In this figure, the input device (0) is a master device, and input devices (1) and (3) are used as slave devices. This figure also shows that the input device (2) is being used for another purpose.

When the input device (2) is used, a status change of the input device (2) is notified (at a in FIG. 22), and display of the input device (2) is reversed, as an input device being used, as shown in the left upper side in the figure and as shown in the display of the operation panel 90 in FIG. 23.

Figure 29:
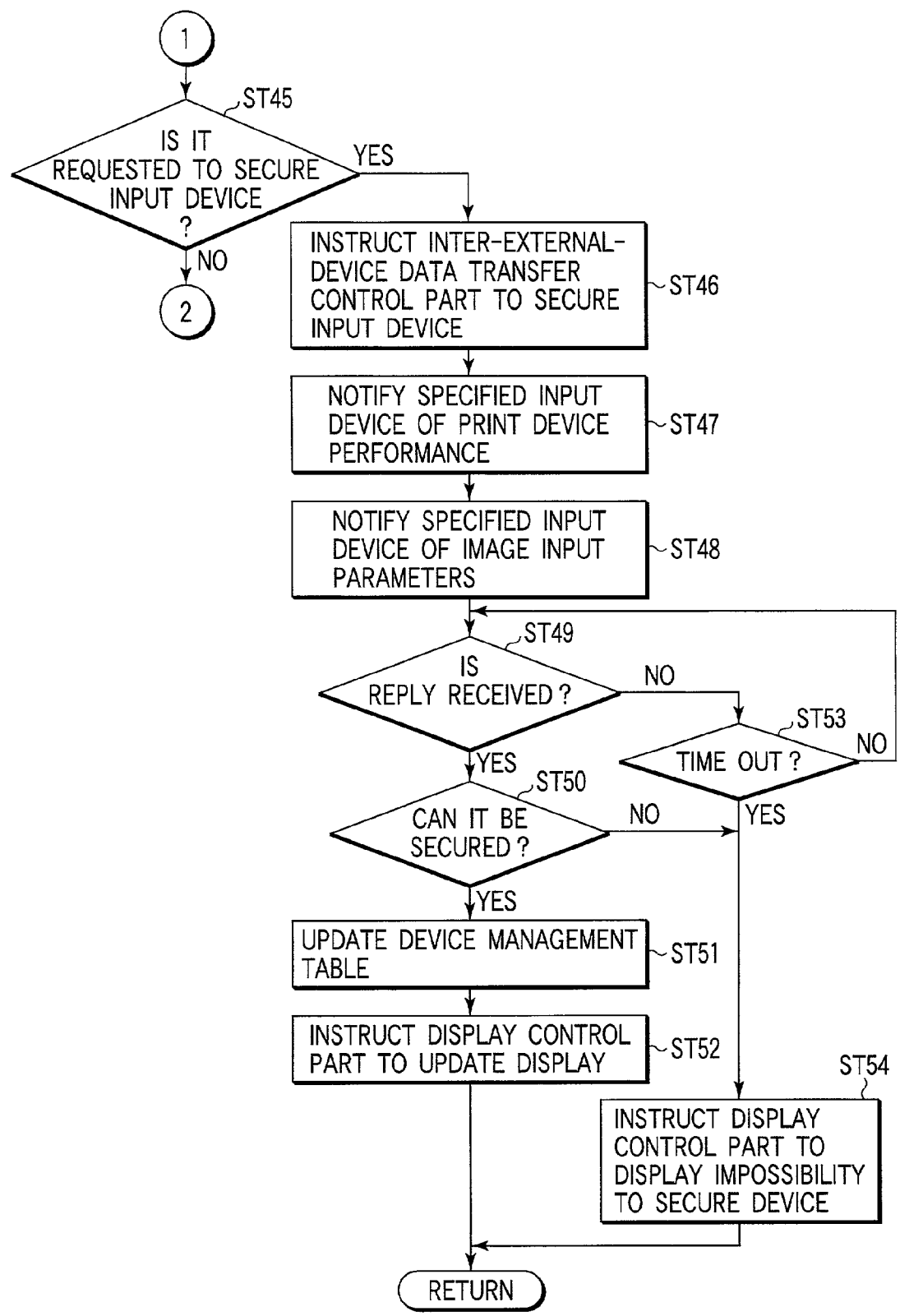
Figure 30:
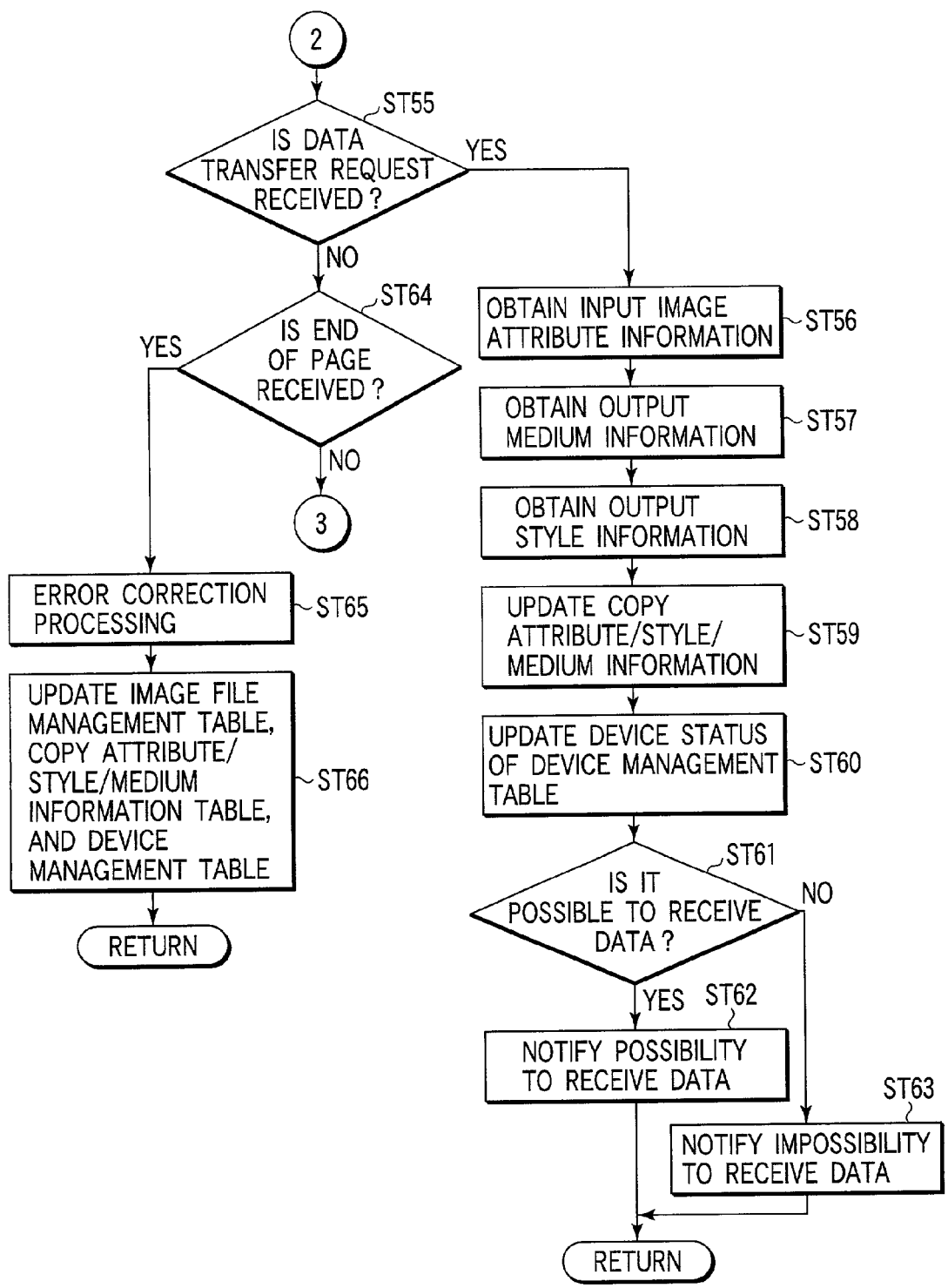
Figure 31:
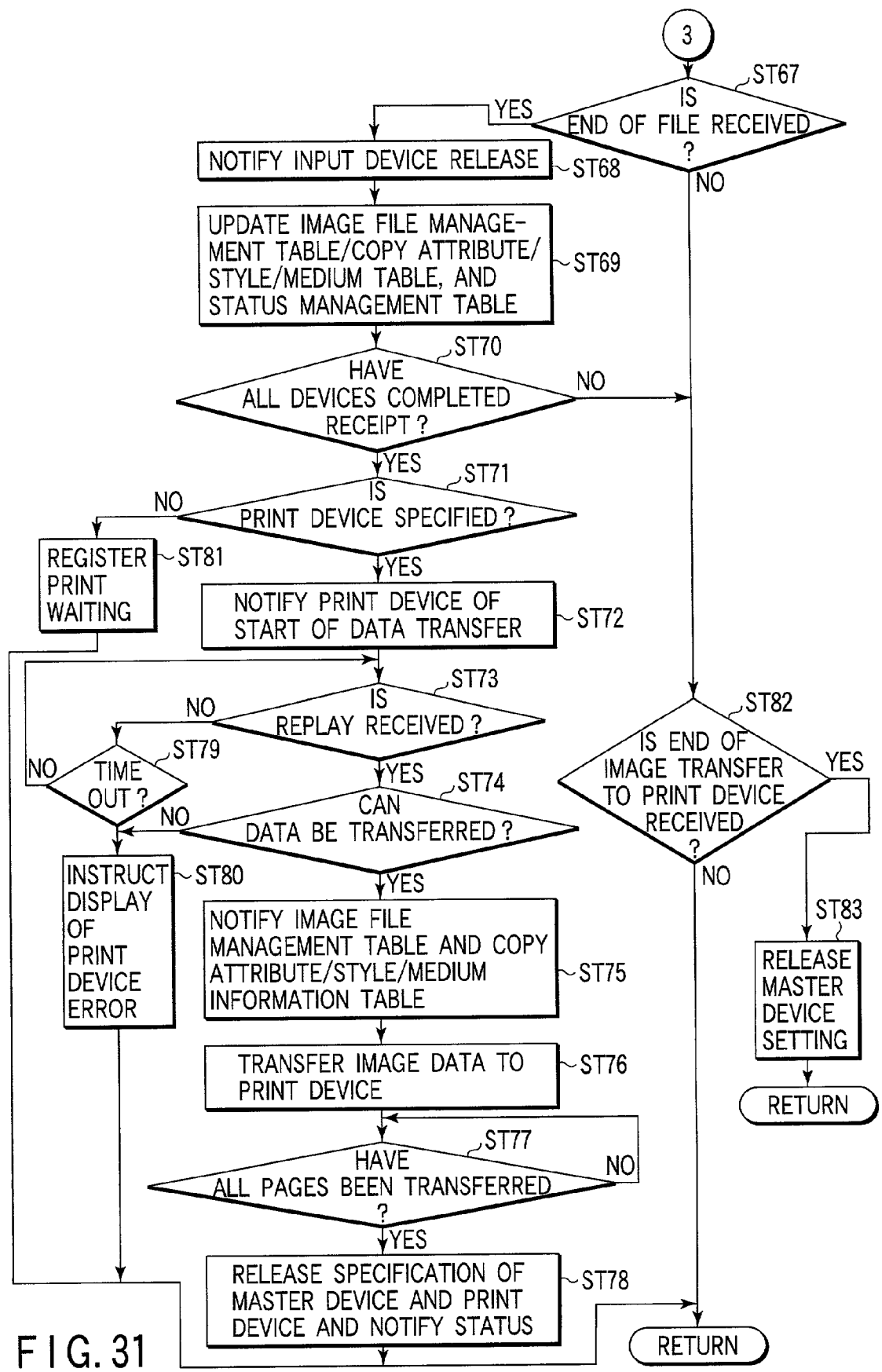

If free input devices (1) and (3) are selected, a control right is obtained (indicated at b in FIG. 22 and a step 45 of "input device secure requirement" to a step 46 in FIG. 29). If it is usable, ACK (acknowledgement) is notified to the master device from the input device (1) and (3) (indicated at c in FIG. 22 and at a step 91 in FIG. 32). In this manner, displays of the input devices (1) and (3) are reversed on the operation panel 90 which indicates the device use status of the input device (0).

Subsequently, the input device (0) notifies its operation conditions (print device performance and image input parameters) to the input devices (1) and (3) which have been specified as slaves (indicated at d in FIG. 22 and in steps 47 to 48 in FIG. 29). In this manner, operation conditions are registered in the input devices (1) and (3) (in steps 94 to 95 in FIG. 32). After this registration, ACK is notified to the input device (0) from the input devices (1) and (3) (indicated at e in FIG. 22 and in steps 97 and 98 in FIG. 32).

At this time, the operating conditions notified from the input device (0) are displayed as parameter confirmation screens by the operation panels 90 of the input devices (1) and (3). The conditions are listed and displayed, classified into image attribute information, output medium information, and output style information.

Also, in the sides of the input devices (1) and (3), a change is made if there is a setting change. For example, setting of "FULL COLOR" is changed to "BLACK" by pressing "CHANGE" corresponding to the color mode, on the parameter confirmation screen of the image attribute information in FIG. 8.

Figure 33:
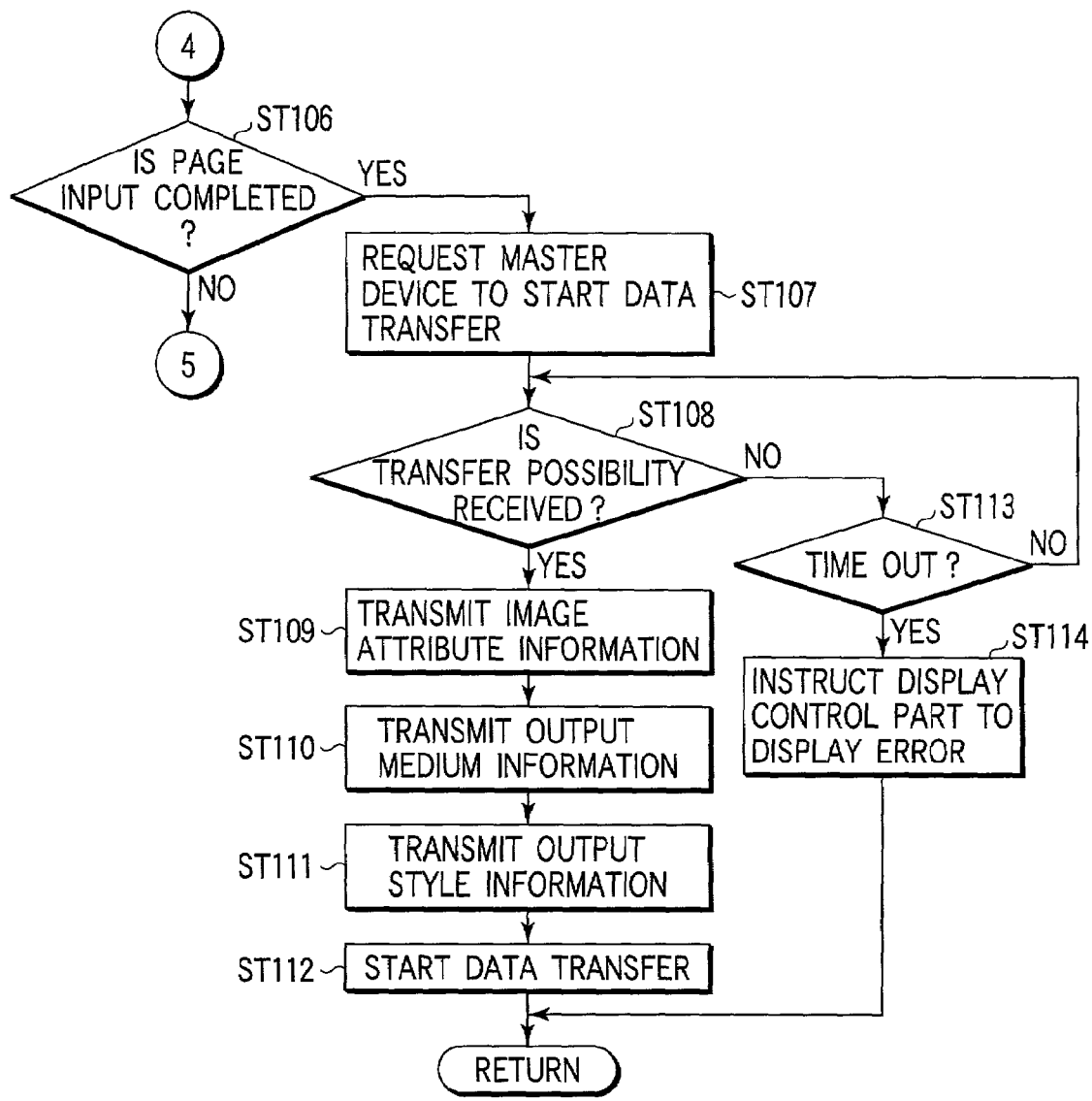

The contents of this change is notified to the input deice (0) from the input devices (1) and (3) (indicated at f in FIG. 22 and in steps 109 to 111 in FIG. 33).

Thereafter, image input is started, i.e., image data is inputted from the input devices (1) and (3). Upon completion of inputting of image data for one page, this image data is transferred to the input device (0) from the input devices (1) and (3) (indicated at g in FIG. 22 and steps 112 in FIG. 33). When transfer of the image data for one page ends, End of Page is notified to the input device (0) from the input devices (1) and (3) (indicated at h in FIG. 22 and in a step 116 in FIG. 34).

After the notification of the End of Page, the input device (0) performs error correction processing or the like on the supplied image data for one page, and registration is made into the image data storage part 137. At this time, the input device (0) notifies the input devices (1) and (3) of information indicating OK of transfer of the image data (indicated at i in FIG. 22).

This is repeated until all pages end. Upon completion of input and transfer of all pages, End of File is notified to the input device (0) (indicated at j in FIG. 22 and a step 118 in FIG. 34).

After the notification of the End of File, the input device (0), the input device (0) performs error correction processing and the like on the supplied image data for one page, and registration is made into the image data storage part 137. At this time, the input device (0) notifies the input devices (1) and (3) of information indicating OK of transfer of the image data (indicated at k in FIG. 22).

Figure 34:
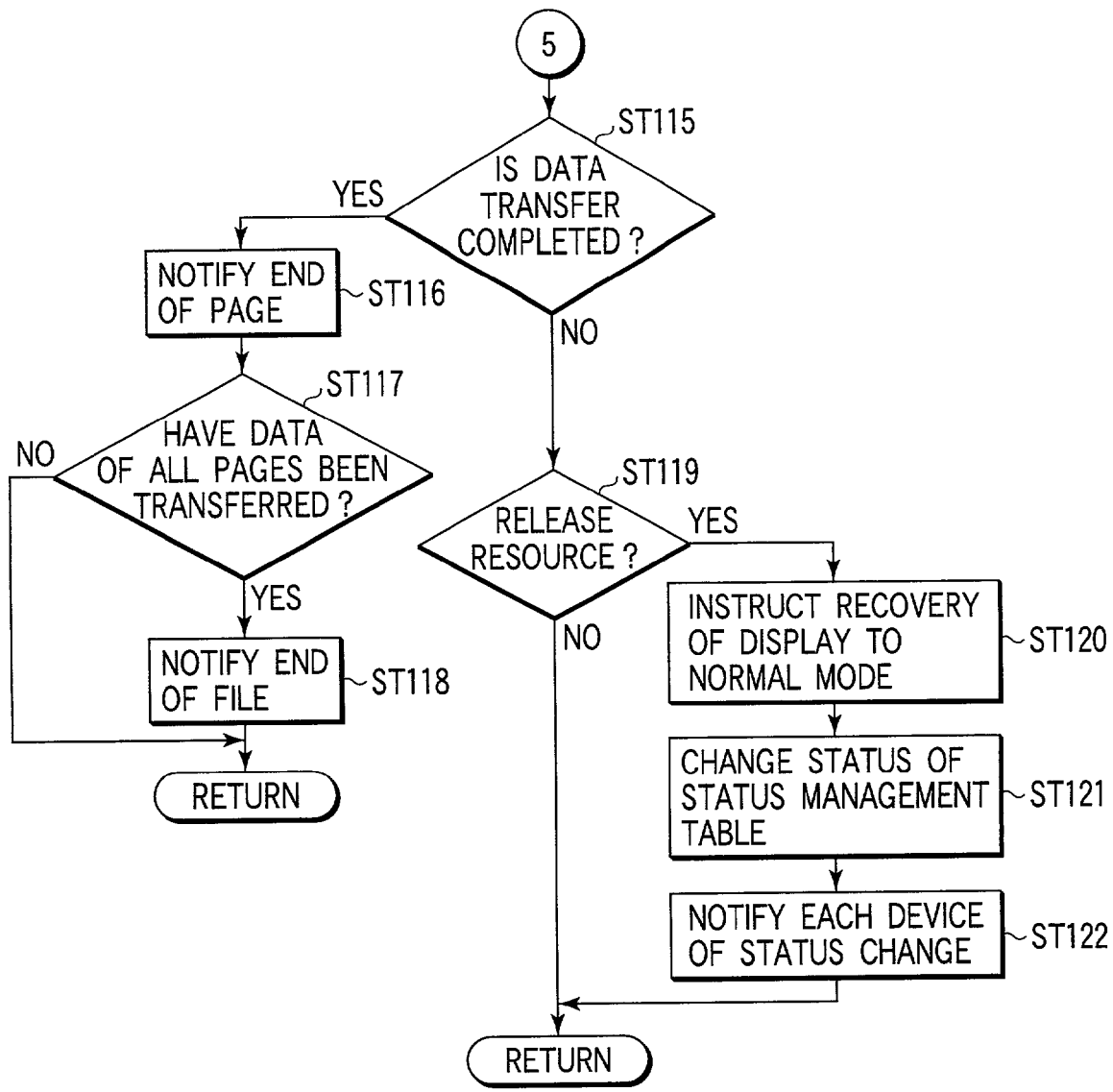

Then, the input device (0) releases control rights of corresponding input devices (1) and (3) (indicated at 1 in FIG. 22 and in a step 68 in FIG. 31), i.e., releases the specification of the input device (1) and (3) as slave devices (in steps 119 to 122 in FIG. 34).

FIG. 23 is a view showing a structural example of a machine status display screen in the master device. This example shows that the device 2 is operating at present, the devices 7 and 8 are in a non-registered (non-detected) status, and the other input device, copying machines, and print devices are brought into a usable status. If devices to be used are selected, they enters into secured status (i.e., using status) by the sequence as shown in FIG. 22, so that displayed icons are reversed.

Figure 25:
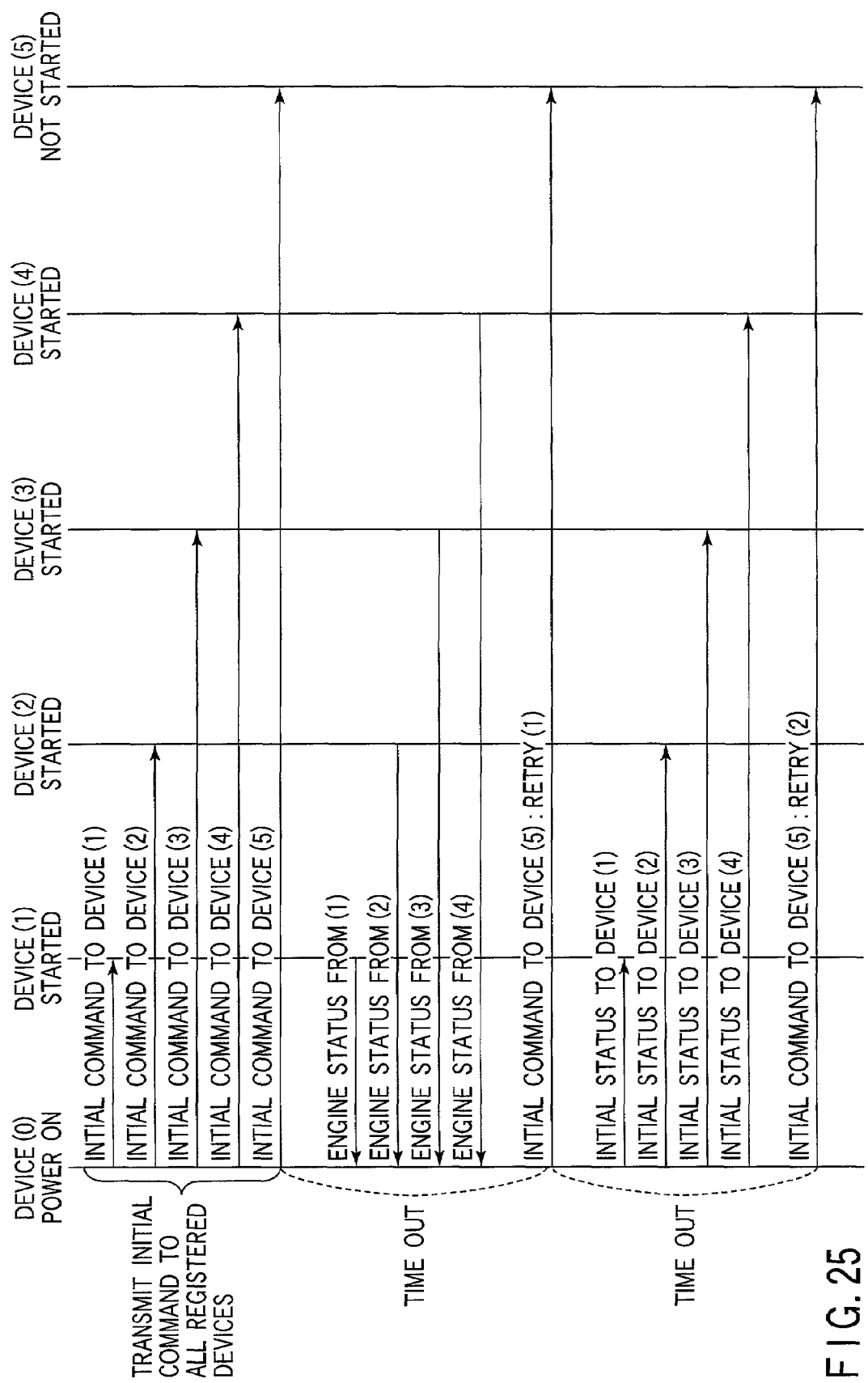
FIG. 25 is a diagram showing an example of forming a network with other devices in an initialization sequence.

FIG. 25 shows an example of forming a network with other devices in an initialization sequence.

This figure shows that the power is turned on in the device (0), the devices (1) to (5) are previously registered in the device (0), and the device (5) is not yet started.

At first, when the power of the device (0) is turned on, an Initial Command is supplied to all of the devices (1) to (5). The devices (1) to (5) initialize their communication information with the device (0) which has sent the Initial Command and notify the device (0), as a sender, of condition of themselves as Engine Status. Upon receipt of the Engine Status, the device (0) notifies all the devices option information that have replied, Error information, and the like of itself, as Initial Status.

In this example, since the device (5) is not started, it has not replied and two retrials are made. If no reply is made even to the two retrials, it is determined that an abnormality has occurred in the network or that the power source has not been turned on. No communication is then made until an Initial Command is received from the device (5) and the communication status is initialized.

Figure 26:
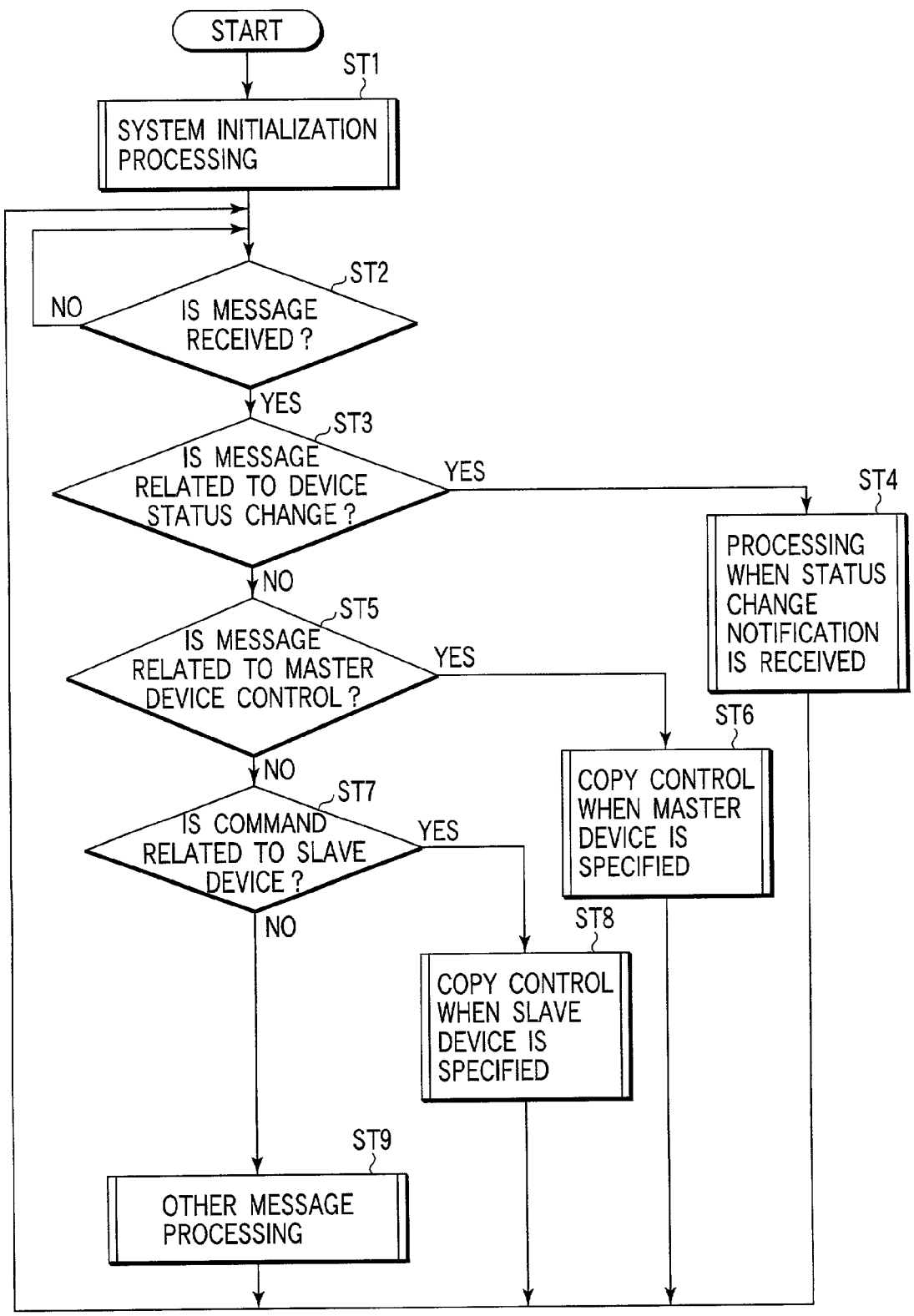
FIG. 26 is a flowchart showing the control procedure in the total control part.

FIG. 26 is a flowchart showing the control procedure in the side of the total control part 130 at the starting time.

When the total control part 130 is started, it executes initialization of the system. System initialization means a total name of an initial sequence including initialization processing for the device itself such as initialization of a parameter table used in common by respective modules, semaphore formation, H/W options attachment check processing, hard disk data clean-up, and the like which are necessary before starting operation, and operation environment formation such as formation of network connection. FIG. 25 shows an example of the flow of network connection formation in the initial sequence.

At first, when the system is initialized (ST1), the total control part 130 waits for a message (ST2) and selects appropriate processing in correspondence with the kind of the message sent from another module.

Figure 27:
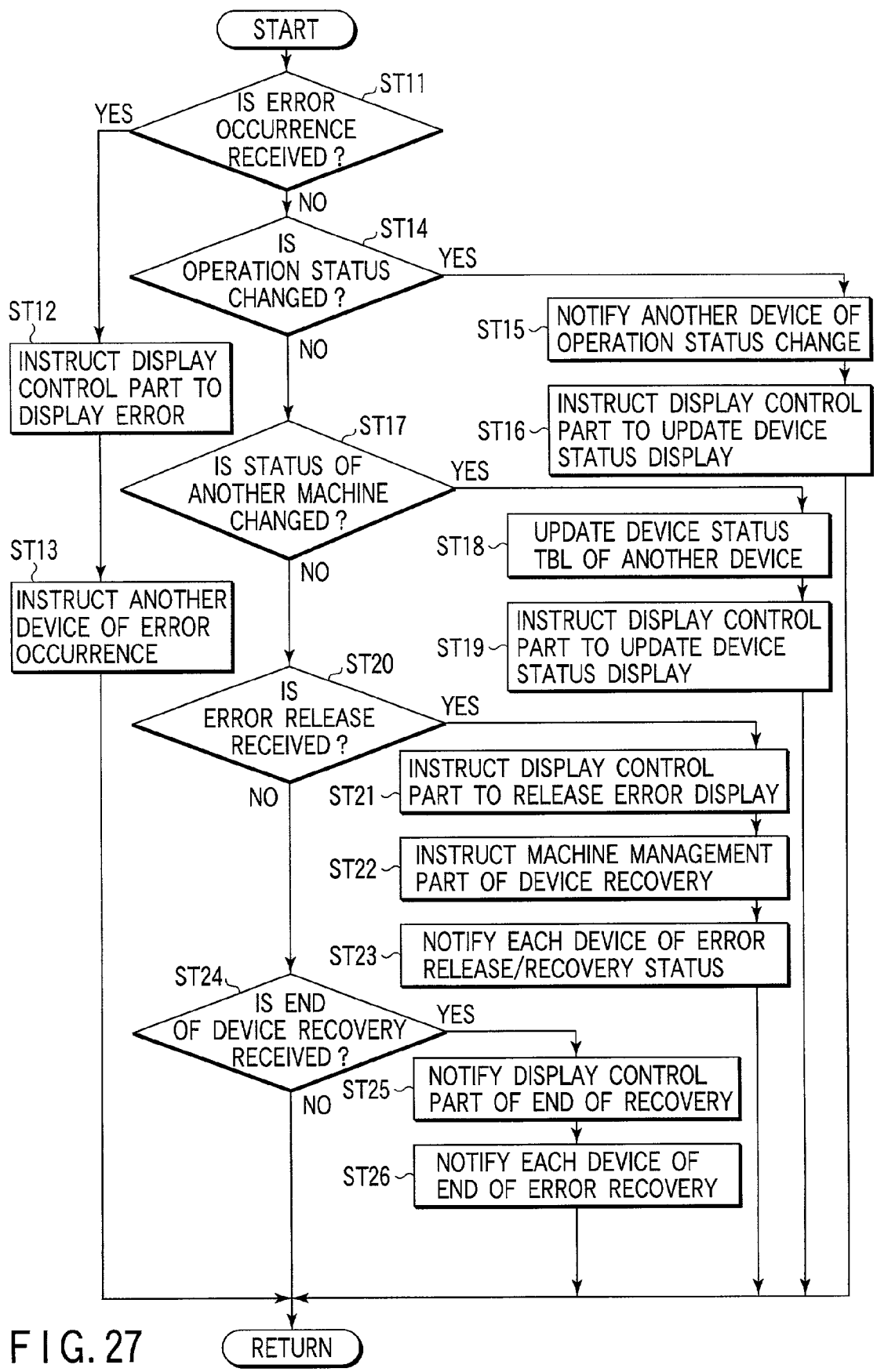
FIG. 27 is a processing flowchart showing the control procedure when a status change message is received in the total control part.
Figure 28:
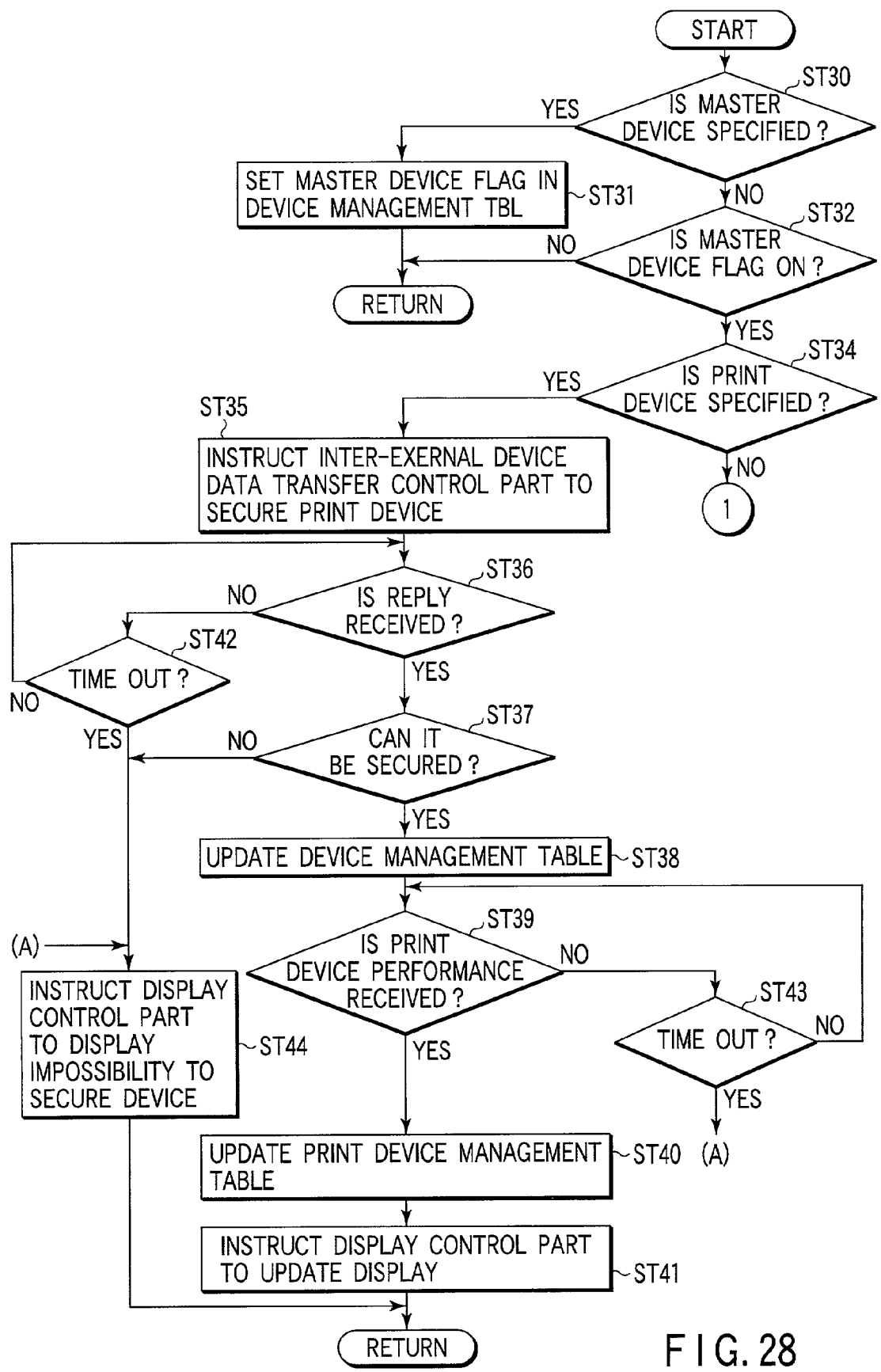
FIGS. 28 to 31 are copy control processing flowcharts in the total control part when specifying a master device.

When the status of a device changes (ST3), e.g., when there is an Error status occurrence/release such as paper jamming, when a status change of another device is received, when an operation status of a device changes (operating, waiting, pausing, working, or the like), or when a message of start/end of heating status of a fixer heater of a device is received, the total control part 130 performs message receipt processing for an operating status change as shown in FIG. 27 (ST4).

When a command related to master device control is received (ST5), the total control part 130 performs receipt processing for receiving a copy control message to specify a master device, as shown in FIGS. 28 to 31 (ST6).

Figure 32:
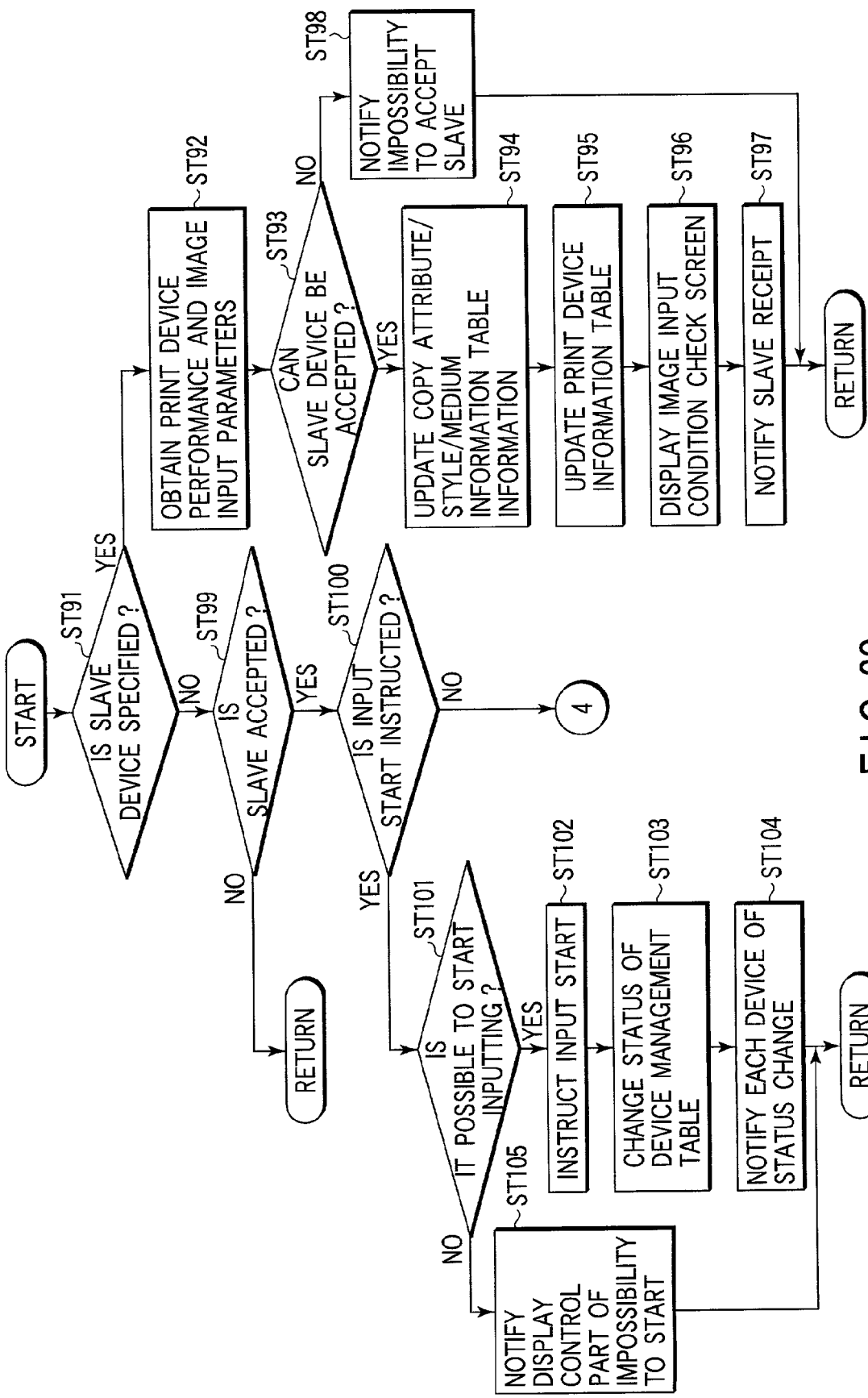
FIGS. 32 to 34 are copy control processing flowcharts in the total control part when specifying a slave device.

When a command related to slave device control is received (ST7), the total control part 130 performs receipt processing for receiving a copy control message to specify a slave device, as shown in FIGS. 32 to 34 (ST8).

When another message is received, processing is appropriately selected (ST9). However, this case is not substantially related the present invention and will therefore be omitted from the explanation.

FIG. 27 is a processing flowchart showing a control procedure when receiving a status change message in the total control part 130.

Upon receipt of Error occurrence from the machine status control part 131 (ST11), the total control part 130 instructs the display control part 132 to make Error display (ST12). Subsequently, the total control part 130 notifies the Error status to other devices connected to the network (ST13) and updates the operation status in the device management table 138c. Then, the procedure returns to the step 2.

When an operation status change such as pressing-down of the operation panel is notified from the machine status management part 131 and the display control part 132 (ST14), the total control part 130 notifies other devices of the operation status like waiting/operating/working/pausing (ST15), and updates the operation status of the device management table 136c (ST16).

Next, in case where a status change of another device is received through an inter-external-device data transfer control part 133 (ST17), the total control part 130 updates the operation status of the device management table 138c (ST18), notifies the display control part 132 of the status change of another device (ST19), and then returns to the step 2. Although not shown in the figures, the display control part 132 updates display, depending on the notification, if status of another device is displayed.

Upon receipt of an Error release (ST20), the total control part 130 notifies the display control part 132 of the Error status release (ST21), updates the operation status of the device management table 138c, and instructs the machine status management part 131 to perform recovery processing for the device (ST22). The recovery processing for a device means a release check by a sensor, heating of a fixing device, resetting of the scanner part 11, resetting of a transfer unit, and the like. Next, the total control part 130 notifies each device connected to the network that it is being recovered (ST23), and then returns to the step 2.

FIGS. 28 to 31 show processing flowcharts when copy control is performed in the total control part 130 in case where a master device is specified.

When a master device is specified (ST30), the total control part 130 sets a master device flag in the device management table 138c (ST31) and returns to the step 2. Also, in case where no master device flag is set (on) in the device management table 138c, the total control part 130 returns to the step 2.

IF a master device flag is set (on) in the device management table 138c in the step 32 described above, the total control part 130 notifies other devices that it has become a master device (ST33). In this manner, the other devices can be used as slaves.

If a print device is specified by the display control part 132 after the notification in the step 33 (ST34), the total control part 130 instructs the specified print device to the inter-external-device data transfer control part 133 (ST35). If a response based on this instruction is received (ST36) and the print device can be secured (ST37), the total control part 130 updates the device management table 138*c* (ST38) and receives print device performance information (ST39). The total control part 130 sets the received print device information in the print device management table 138*d* (ST40). Subsequently, the total control part 130 notifies the display control part 132 of completion of securing of the print device (ST41).

If a response based on an instruction in the step 35 cannot be received after elapse of a predetermined time (ST42), the total control part 130 notifies the display control part 132 of impossibility to secure the print device (ST44).

If the print device cannot be secured in the step 37, the total control part 130 notifies the display control part 132 of impossibility to secure the print device (ST44).

After the notification in the step 44, the procedure returns to the step 2.

If the display control part 132 gives an instruction to secure the input device after the notification in the step 33 (ST45), the total control part 130 instructs the inter-external-device data transfer control part 133 to secure the input device (ST46). Subsequently, the total control part 130 notifies image input parameters and print device performance which are set in the copy attribute/style/medium information table 138*b* (ST47 and 48).

If a response is received (ST49) after this notification and the corresponding device can be secured (ST50), the total control part 130 updates the device information of the device management table 138*c* (ST51) and notifies the display control part 132 of completion of securing the corresponding input device (ST54). The procedure then returns to the step 2.

If no response is received even after elapse of a predetermined time in the step 49 (ST53), the display control part 132 is notified of impossibility to secure the input device (ST54), and the procedure returns to the step 2.

If it is impossible to secure the corresponding input device in the step 50, the display control part 132 is notified of impossibility to secure the input device (ST54), and returns to the step 2.

If a transmission start request (receipt of a data transfer request) of inputted image data is received from an input device specified as a slave through the inter-external-device data transfer control part 133 after the notification in the step 33 (ST55), the total control part 130 obtains input image attribute information, output medium information, and output style information (ST56, 57, and 58) sent through the inter-external-device data transfer control part 133. Subsequently, the total control part 130 updates the copy attribute/style/medium information table 138*b* (ST59), depending on the obtained input image attribute information, output medium information, and output style information. Further, the total control part 130 updates the operation status of the device management table 138*c* during operation (ST60).

If it is possible to receive data (ST61) after the update, the total control part 130 notifies the slave device of the possibility to receive data (ST62), and returns to the step 2. Also, if it is impossible to receive data (ST61), the slave device is notified of the impossibility to receive data (ST63), and returns to the step 2. The case of impossibility to receive data is, for example, a case that the master device falls into error status.

After the notification in the step S33, transmission for one page is completed. If End of Page is received (ST64), the total control part 130 carries out Error correction processing (details of which will be omitted herefrom) (ST65), and updates the image file management table 138*a*, copy attribute/style/medium information table 138*b*, and device management table 138*c* (ST66). The procedure then returns to the step 2.

If End of File is received (ST67) when receipt of data of all pages is completed after the notification in the step 33, the total control part 130 releases resources of the input device which has transmitted the corresponding data (ST68). Subsequently, the total control part 130 updates the image file management table 138*a*, copy attribute/style/medium information table 138*b*, and device management table 138*c* (ST69).

Thereafter, when End of File is received with respect to all of the input devices (ST70), the total control part 130 notifies start of data transfer to a print device (ST72) if a print device is specified (ST71). If a reply based on this notification is received (ST73) and data transfer from the print device is possible (ST74), the total control part 130 notifies the print device of the contents of the image file management table 138*a* and the copy attribute/style/medium information table 138*b* (ST75). Subsequently, the total control part 130 transfers all of the print data to the print device (ST76).

When transfer of all the print data to the print device is completed (ST77), the total control part 130 specifies the master device, releases specification of the print device, and notifies another input device of the status (ST78).

If no print device is specified in the step 71, the total control part 130 outputs data through a digital copying machine of its own, and therefore makes registration into the print-wait QUE in a table not shown. Processing is then terminated (ST78) and returns to the step 2.

If no response is received to the notification of start of data transfer in the step 72 even after elapse of a predetermined time (ST73 and 79), the total control part 130 notifies the display control part 132 of error display of the print device (ST80), and returns to the step 2.

If normal completion of image transfer to the print device is received after the notification (ST82), the total control part 130 releases the status of the master device and the specification of the print device, completes then all of the input processing (ST83), and returns to the step 2.

If nothing is received after the notification in the step 33, the total control part 130 returns to the step 2, too.

FIGS. 32 to 34 are flowcharts showing copy control processing in the total control part 130 when a slave device is specified.

When a slave device is specified (ST91), the total control part 130 obtains print device performance and image input parameters for input operation, which are notified from the master device (ST92). If it is in status capable of accepting the device as a slave device (i.e., in status in which Error or the like does not occur or it is not used) (ST93), the total control part 130 updates the copy attribute/style/medium information table 138*b* and the print device management table 138*d* (ST94 and 95) as shown in FIGS. 18 to 21. Further, the total control part 130 controls the display control part 132 and updates the screen display to the display of slave status shown in FIGS. 7 to 9 (ST96). Possibility to accept a slave is notified to the master device (ST97). If it is impossible to accept a slave, the total control part 130 notifies the master device of the impossible acceptance as a slave device (ST98), and returns to the step 2.

If possibility to start reading an original document is received from the master device, the possibility to start reading is notified to the display control part 132, and lock of the start key shown in FIGS. 7 to 9 is released.

When start of inputting is instructed from the display control part 132 (ST100), the total control part 130 notifies the input/output operation control part 134 in FIG. 10 of the instruction to start inputting (ST102) if it is possible to start inputting (ST101). Also, the total control part 130 updates the status of the device management table 139c to wording (ST103), and notifies each device of the status change (ST104). The part 130 then returns to the step 2.

If it is determined that start of inputting is impossible due to some factor such as Error or the like in the step 101 described above, the total control part 130 notifies the display control part 132 of the impossibility to start inputting, as an Error display, (ST105) and then returns to the step 2.

Upon completion of inputting one page (ST106), the total control part 130 requests start of data transfer (ST107) to the master device. If a reply indicating possibility to transfer data is received in response to this request (ST108), the total control part 130 transmits the image attribute information of inputted image data, output medium information specified at the time of inputting, and the output style information specified also at the time of inputting, to the master device (ST109, 110, and 111). The total control part 130 subsequently transmits the inputted image data to the master device (ST112).

If a reply indicating the possibility to transfer data cannot be received in response to the request for starting data transfer in the step 107, the total control part 130 instructs the display control part 132 to display Error and ends the processing (ST114).

Upon completion of transfer of image data for one page (ST115), the total control part 130 transmits End of Page to the master device (ST116). If transmission of all the page data ends (ST117), the total control part 130 transmits End of File to the master device (ST118).

If release of resources is notified from the master device (ST119), display of the display control part 132 is recovered to a normal mode (ST120), and the status of the device management table 139c is changed to waiting status (ST121), thereby to notify each input device of the status change (ST122).

Figure 36:
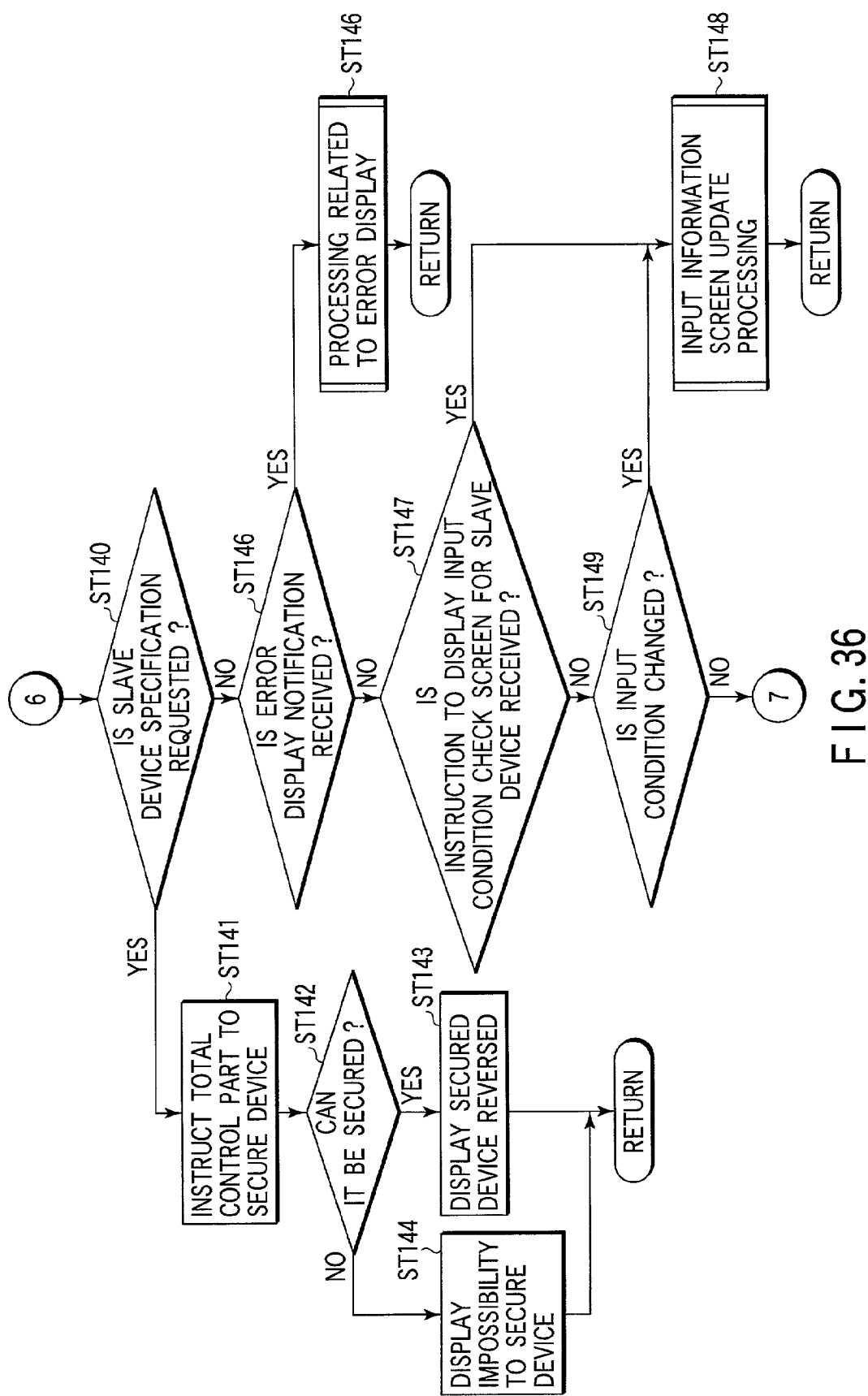
Figure 37:
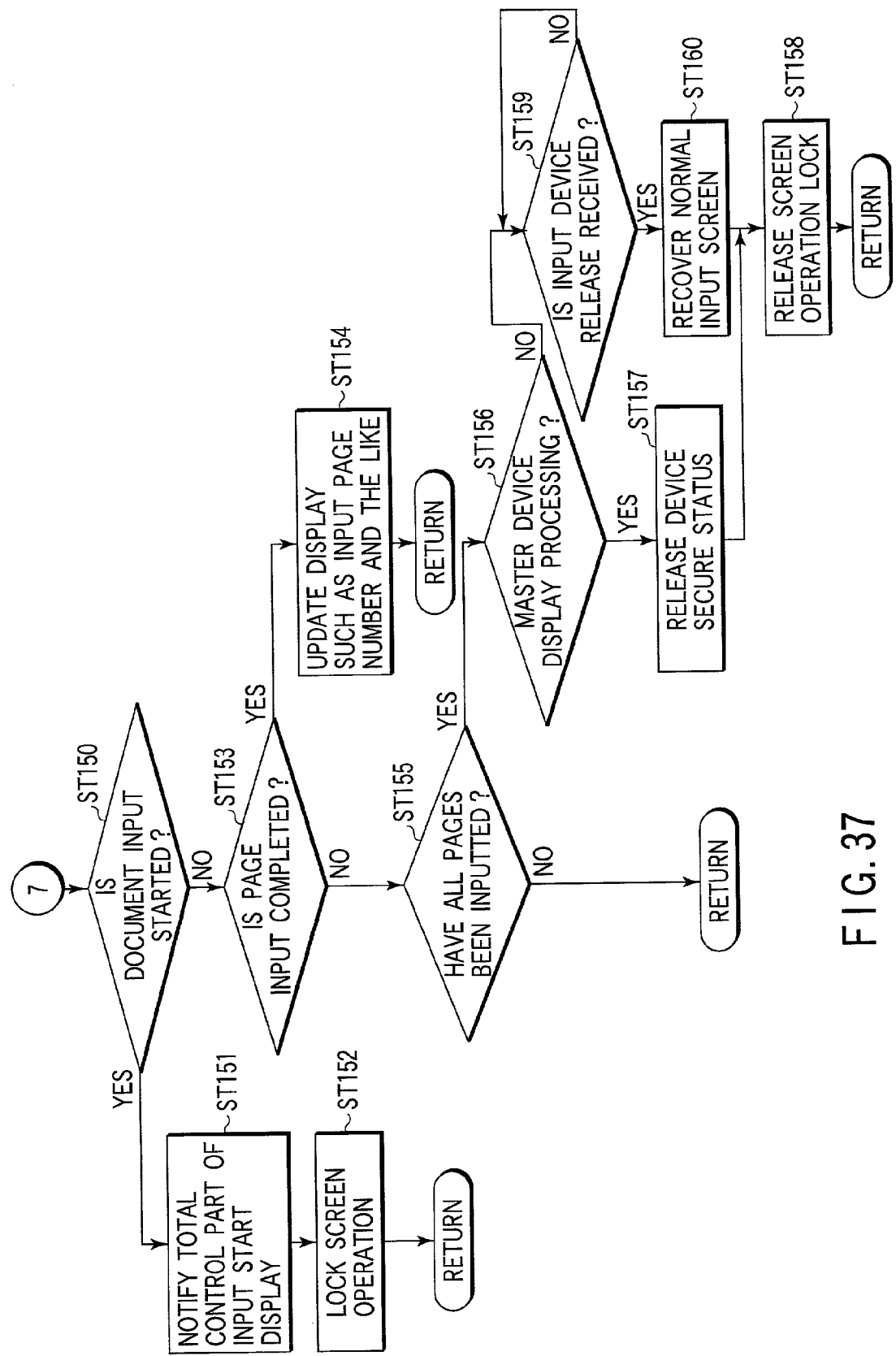

FIGS. 35 to 37 are flowcharts showing the processing in the display control part 132.

If initialization of the display control part 132 is instructed in the initialization processing in the total control part 130 (ST131), the display control part 132 performs generation of a display screen and initialization processing or the like of each internal table (ST132), and then returns to the step 2.

When update of status display is instructed (ST133), the display control part 132 obtains information of the device management table 138c (139c) (ST135) and updates the device status display (ST136) if a status display screen is displayed (ST134). The procedure then returns to the step 2. If the status display screen is not displayed in the step 134, the display control part 132 returns to the step 2.

When a master device is specified (ST137), the display control part 132 notifies the specification of the master device to the total control part 130 (ST138). Next, the display control part 132 switches the display to a status display screen of another input device or a print device connected through the network (ST139), and then returns to the step 2.

When a slave device is selected on the status display screen (ST140), the display control part 132 requests the total control part 130 to secure a specified device if there is a specification of a slave device (ST141). When a device can be secured (ST142), the display control part 132 reverses the display of the secured device and clearly indicates that the device is secured (ST143). The procedure then returns to the step 2. If no device can be secured (ST142), the display control part 132 displays a warning message indicating the impossibility to secure the device (ST144), and then returns to the step 2.

If a message related to Error display is received from the machine status management part 131 (ST145), the display control part 132 performs Error status display (ST146). This message includes Error occurrence, Error release, start of device status recovery processing at the time of Error release, and the like. Detailed explanation of this message will be omitted because it does not particularly relate with the present invention.

Next, if specification as a slave device is notified from the total control part 130 (ST147), the display control part 132 switches the display to the operation condition display screen in the side of the slave device, as shown in FIGS. 7 to 9 (ST148). A display procedure in display of an input condition check screen will be shown in details in FIG. 38.

Figure 38:
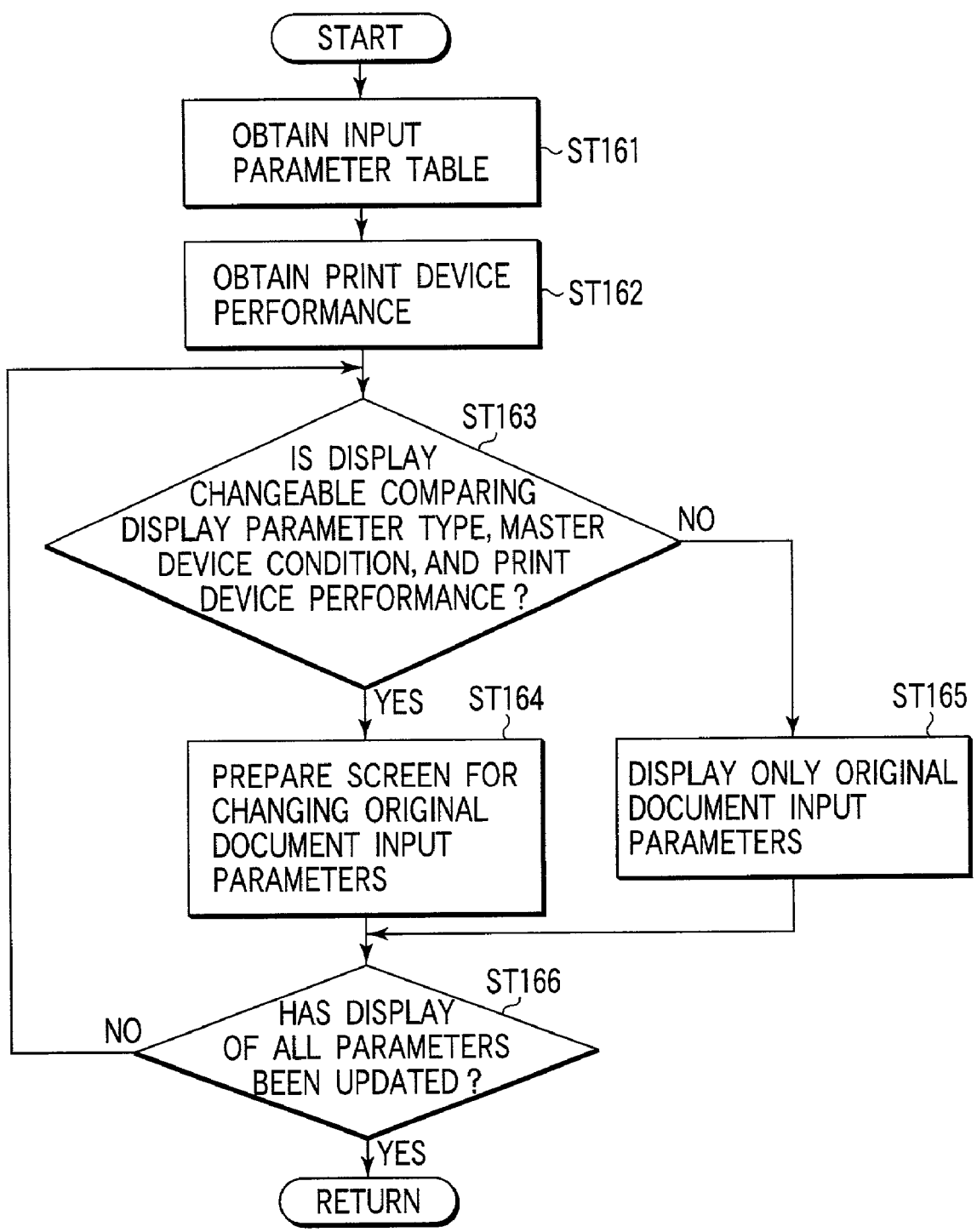
FIG. 38 is a control flowchart in the display control part when updating information of input parameters.

Also, when input condition parameters are changed when specifying a slave device (ST149), the display control part 132 updates display in accordance with the procedure shown in FIG. 38 (ST148).

If start of inputting an original document is instructed (ST150), the display control part 132 notifies the total control part 130 of the start of inputting (ST151), locks the screen operation until end of input processing (ST152), and then returns to the step 2.

When completion of inputting one page is notified (ST153), the display control part 132 updates the display contents such as the number of inputted pages (ST154). Upon completion of inputting all pages (ST155), the display control part 132 releases display of securing slave devices (ST157) in case of a master device (ST156), and further releases the lock of the screen operation (ST158).

In case of a slave device in the step 156 described above, the display control part 132 receives release of the input device (ST159), thereafter switches the display to a normal input screen (ST160), and releases the lock status of the screen operation (ST158).

FIG. 38 shows a flowchart of the control in the display control part 132 when updating the image input parameters.

When update of display of image input parameters is instructed, the display control part 132 classifies image attribute information, output medium information, and output style information, as shown in FIGS. 7 to 9, and obtains operation condition information in the master device, from the copy attribute/style/medium information table 139b (ST161). Further, the display control part 132 obtains print device performance information from the print device management table 139d shown in FIG. 21 (ST162). Types of display parameters, conditions defined in the master device, and print device performance information are compared with each other (ST163). With respect to those parameters that are determined to be changeable on the display, screen data expressing possibility to update parameters is prepared and displayed (ST164), as shown in FIGS. 7 to 9. With respect to those parameters that are determined to be impossible to change, not icons but only the contents of the parameters are displayed (ST165).

The determination whether a change is possible or impossible depends on the points (1) conditions specified by the master device are prior with respect to functions (a sort/staple function, a binding function, and the like) in which data of the master device and input data at a slave device must be dealt with unitarily, and (2) conditions decided under particular conditions (paper feed source information when a particular output medium is specified and the like). Functions that are not supported by a print device and output medium information which is not supported are rendered non-selectable.

Upon completion of preparation and display of image data (ST166) with respect to all parameters, the processing is completed and returns to the step 2.

Figure 39:
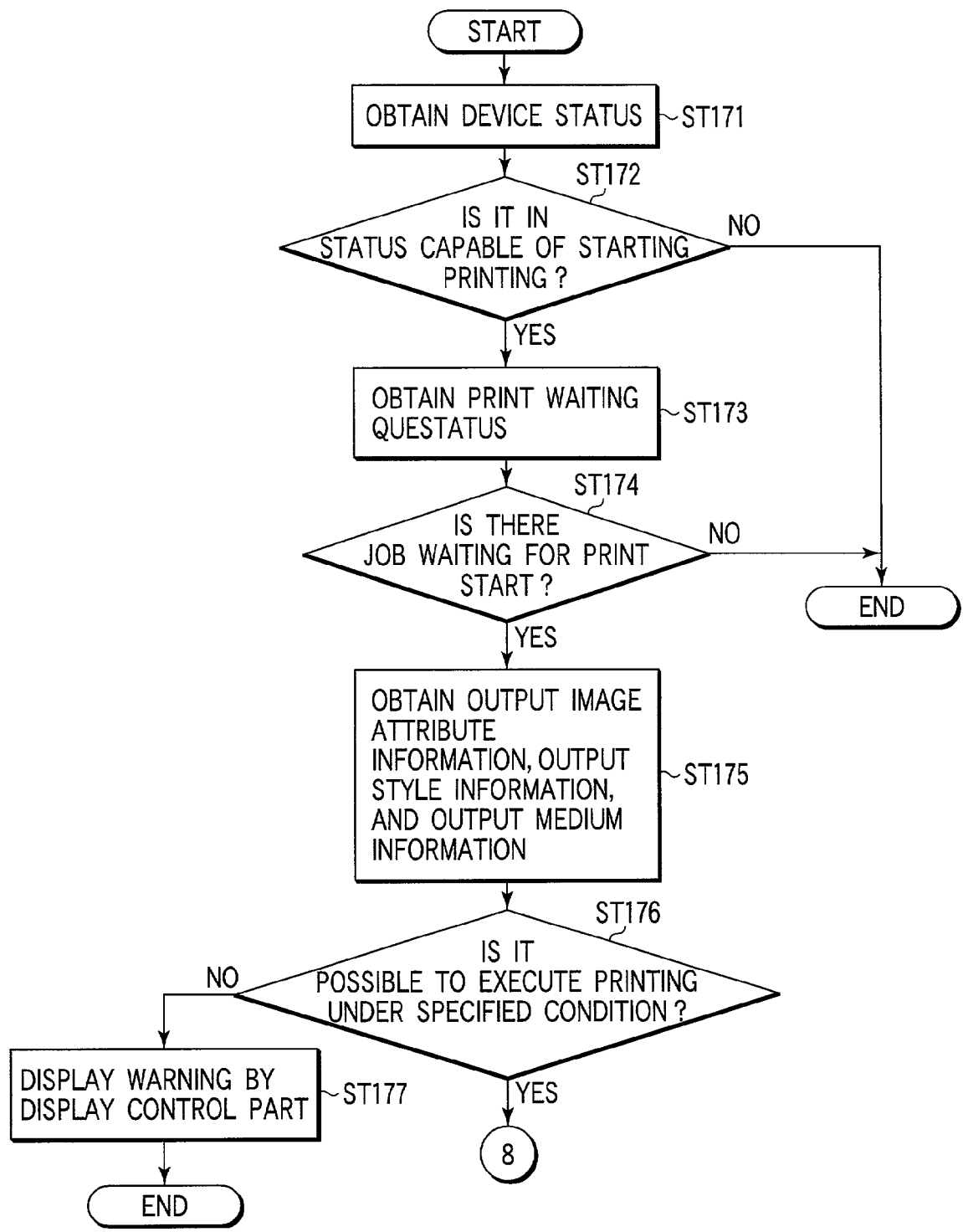
FIGS. 39 and 40 are flowcharts showing the print processing procedure in the input/output operation control part.
Figure 40:
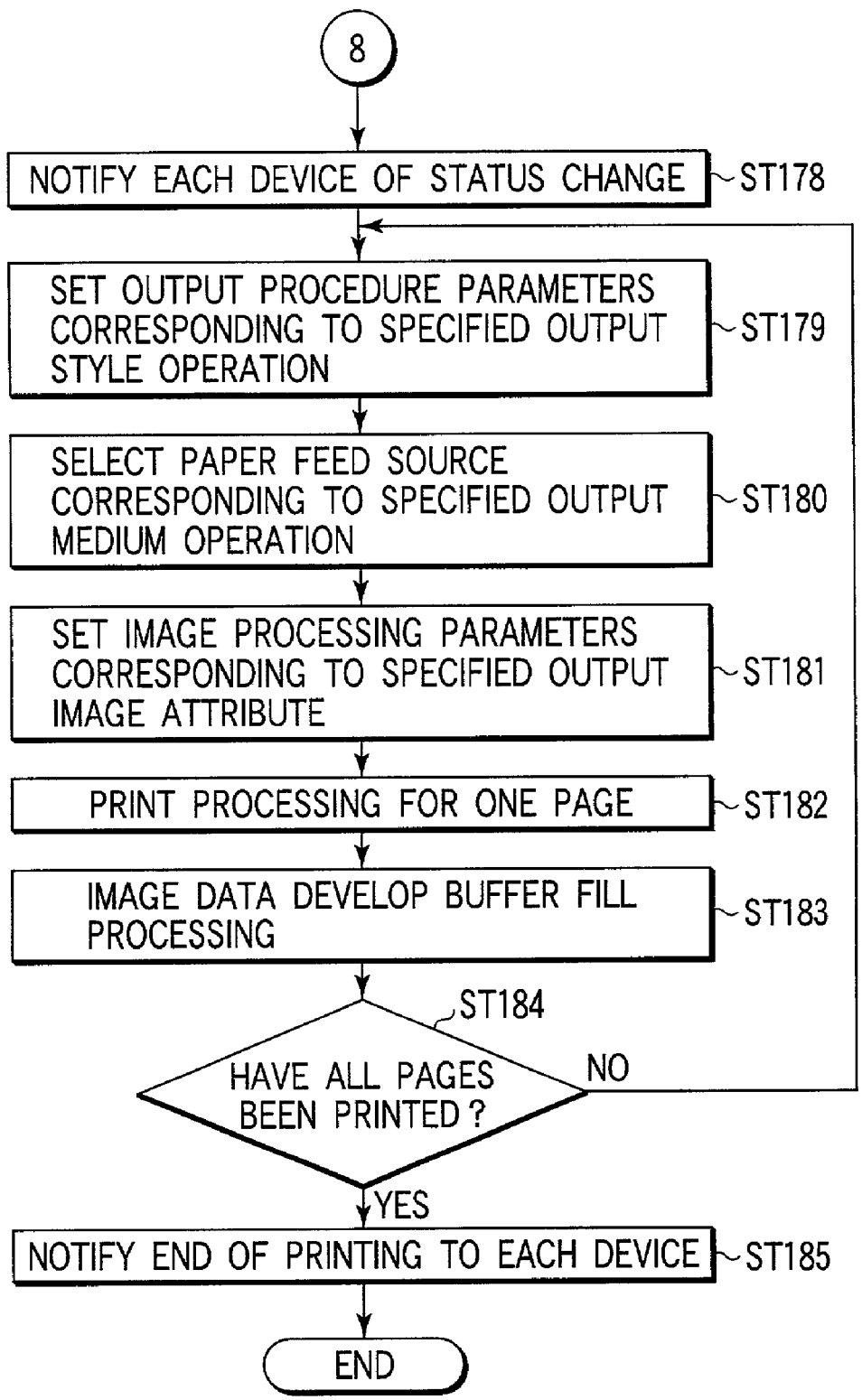

FIGS. 39 and 40 are flowcharts showing the control in the input/output operation control part 134 when printing is carried out.

To start printing, the input/output operation control part 134 obtains the device status of the print device specified to perform printing or the image forming device (ST171). The device status specifically means presence/absence of Error occurrence or a job being executed. If it is impossible to start printing, the processing is ended and a next print start timing is waited.

Subsequently, if it is possible to start printing (ST172), the input/output operation control part 134 confirms print waiting QUE status (presence/absence of a job waiting for printing) (ST173). If there exists a print-waiting job (ST174), the input/output operation control part 134 obtains output image attribute information, output style information, and output medium information shown in FIGS. 12 to 17 (ST175). If a specified condition is impossible to execute (ST176), the input/output operation control part 134 notifies the display control part 132 of the print device of a warning message indicating the impossibility to start printing, and ends the processing (ST177). A next print start timing is then waited. In this manner, the display control part 132 displays a warning message indicating the impossibility to start printing.

If conditions specified in the step 176 are executable, the input/output operation control part 134 start print processing and notifies each device of the status change of the print device (e.g., a change from waiting status to working status) (ST178).

Next, the input/output operation control part 134 sets output procedure parameters corresponding to a specified output style (ST179), selects a paper feed source where specified output media are set (ST180), and also sets image processing parameters corresponding to specified image attributes (ST181). Print processing is then started.

Upon completion of processing for one page (ST182), the input/output operation control part 134 performs FILL processing (initialization processing) of a page buffer (which is a memory area secured in the PM shown in FIG. 4) to develop image data (ST183). The input/output operation control part 134 repeats this processing for all pages. Upon completion of processing for all pages (ST184), the input/output operation control part 134 notifies all devices of the status change (which is a change from working status to waiting status) (ST185), ends the processing, and waits for a next print start timing.

If it is impossible to start printing in the step 172 or if there exists no print-waiting job in the step 174, the input/output operation control part 134 ends the processing and waits for a next print start timing.

According to the present invention, setting of control methods and parameters for reading images is rendered changeable for every one of a plurality of image forming devices or image reading devices connected through a network or the like. As a result of this, there is an advantage in that the efficient of image reading operation can be improved to be suitable for various types of images.

According to the present invention, there is an advantage in that improved variety is attained in one copying operation and the throughput is improved, in an environment in which a plurality of digital image forming devices, image input devices, and image output devices are connected through a network or the like.

According to the present invention, there is an advantage in that operationality is improved with respect to various original documents such as a photograph document, text document, single-sided document, double-sided document, and the like, and the throughput of these original documents which are going to become more various is improved, in an environment in which a plurality of copying machines, scanner devices, and printer devices are connected through a network or the like.

According to the present invention, input conditions such as a document mode, density, and the like, output medium information such as OHP and the like, and output style information such as double-sided and the like, which are specified by a scanner or digital copying machine specified as a master device, are displayed integrally in the side of a digital copying machine or scanner device specified as a slave device. Changeable conditions are thus presented to users. As a result, there is an advantage in that user setting operations in the image input operation in the side of the slave device can be reduced in an environment in which a plurality of copying machines, scanner devices, and printer devices are connected through a network or the like.

According to the present invention, when transmitting image data to a scanner or a digital copying machine specified as a master device from the side of a digital copying machine or a scanner device specified as a slave device, density information, document type information such as a photograph document, a text document, or the like, adjustment value information for gamma correction, and the like specified for every device are transmitted, attached to image data. As a result of this, there is an advantage in that an optimal output result can be obtained rapidly in correspondence with the types of input documents such as a text document, a photograph document, a document having a strong background color, and the like, which are going to become more various, in an environment in which a plurality of copying machines, scanner devices, and printer devices are connected through a network or the like.

According to the present invention, when transmitting image data to a scanner or a digital copying machine specified as a master device from the side of a digital copying machine or a scanner device specified as a slave device, output medium information such as a thick paper, color-dedicated paper, normal paper, OHP, and the like specified for every device is transmitted, attached to image data. As a result of this, it is possible to specify any of various kinds of output media for every input device in correspondence with any of various types of input documents such as a photograph document, catalogue, and the like. Accordingly, there is an advantage in that an output medium can be switched in the middle of output, so that an optimal output result can be obtained rapidly in an environment in which a plurality of copying machines, scanner devices, and printer devices are connected through a network or the like.

According to the present invention, when transmitting image data to a scanner or a digital copying machine specified as a master device from the side of a digital copying machine or a scanner device specified as a slave device, output style information such as single/double-sided printing, 90°-rotated printing, reversed output, descending/ascending-order output, and the like specified for every device is transmitted, attached to image data. As a result of this, any of these output style can be specified for every input device in correspondence with any of various types of input documents which are going to become more various. Accordingly, there is an advantage in that the output style can be switched in the middle of output in response to an output style request, so that an optimal output result can be obtained rapidly in an environment in which a plurality of copying machines, scanner devices, and printer devices are connected through a network or the like.

Also, according to the present invention, a plurality of input devices and image forming devices are connected through a network, and any of the image forming devices can be used as a master device. If one of the image forming devices is specified as a master device and the others are specified as slave devices, the image forming devices are respectively assigned with different print processing ID numbers, in an environment in which operation parameters of the image forming devices as slave devices are set from the image forming device of the master device the image forming device of the master device, and image data can be transmitted from the slave devices to the master device. Image data storage areas which are respectively specific to the ID numbers are secured in the storage device of the master device for every ID number. Based on the ID numbers, input image data is integrated and finally subjected to print processing as one image file data.

Also, a part of input parameters such as a document mode, double/single-side, ADF/manual insertion, a density adjustment value, and the like, which are specified from the master device, can be changed in the side of a slave device upon necessities.

In many conventional cases, much time is required to input an original document like the case of a color document, so that processing ability of printing devices can not be sufficiently executed. However, reduction of the memory input processing time for image data leads to improvements of copying throughput due to digitalization of copying machines.

Also, it has become necessary to respond to more types of documents, as application of color documents has being progressing and spreading. However, in general conventional cases of copying an document in which color and monochrome documents are mixed or photographs and text documents are mixed, they are copied separately and users mixes manually their copies after copying operation. However, by integrating inputted image data on a memory with use of a plurality of digital copying machines, documents in which documents of various attributes corresponding to the number of devices are mixed can be subjected to print processing at once by one time of copying.

What is claimed is:

1. An image forming system constructed by a plurality of devices connected, comprising:

a first device having at least a read function to read an original document image, a setting function to set a processing condition with respect to image data thus read, and a transmission function to process and transmit the original document image read under the processing condition set by the setting function; and a second device connected to the first device and having a change setting function to change the processing condition set by the setting function of the first device, of the original document image received from the first device, upon receipt of the original document image transmitted from the first device, and an image output function to perform processing on the original document image under the processing condition changed by the change setting function, thereby to output an image, wherein each of the first and second devices has a read function, a setting function, a transmission function, a receive function, a change setting function and an image output function, and further has a specification function to specify one of the first and second devices as a master, and the other one as a slave, and if one of the first and second devices is specified as a master, the read function, setting function, and transmission function are assigned to the device specified as the master, and the receive function, change setting function, and image output function are assigned to the other one of the first and second devices.

2. An image read system in which a plurality of first devices having at least a read function to read at least a original document image, and a second device having at least a setting function to set a read condition are connected through a communication channel, wherein each of the first devices has a read function to read the original document, based on the read condition supplied from the second device, and the second device has setting means for setting a read condition for the read function of each of the first devices, and an interface for outputting the read condition set by the setting means to each of corresponding one or ones of the first devices, wherein each of the first and second devices has the setting function and the read function, a master is specified by any one of the first and second devices, thereby to specify other devices as slaves, and individual read conditions are respectively set with respect to the devices specified as the slaves, by the setting function of the device specified as the master, and the read conditions set by the device specified as the master are displayed in form of a list in the devices specified as the slaves.

3. An image read system in which a plurality of first devices having at least a read function to read at least a original document image, a second device having at least a setting function to set a read condition, and a third device having at least an image forming function to form an image based on image data, on a medium where an image is to be formed, are connected through a communication channel, wherein each of the first devices is comprised of a scanner for reading the original document image, based on the read condition supplied from the second device, and a first interface for outputting the image data read by the scanner to the third device, together with an image forming condition of the image data supplied from the second device, to the third device, the second device is comprised of setting means for setting a read condition for the read function of each of the first devices, and individual image forming conditions for image data, respectively corresponding to the first devices, and a second interface for outputting the read condition set by the setting means to each of corresponding one or ones of the first devices, and the third device has an image forming device for forming an image based on image data supplied from the first devices, on an image forming medium where an image to be formed, based on the image forming condition supplied together with the image data, wherein each of the first and second devices has the setting function and the read function, a master is specified by any one of the first and second devices, thereby to specify other devices as slaves, and read conditions and image forming conditions are set with respect to the devices specified as the slaves, by the setting function of the device specified as the master, and the read conditions and image forming conditions set by the device specified as the master are displayed in form of a list in the devices specified as the slaves.

4. The system according to claim 3, wherein the read condition is density information, original document type information including a photographic original document, or a text original document, image attribute information including adjustment value information for correcting gamma.

5. The system according to claim 3, wherein each of the image forming condition is a condition which specifies image formation on one surface of the image forming medium, image formation on both surfaces of the image forming medium, rotation of image data, reversal of image data, and image forming style expressing descending or ascending order of a plurality of pages of image data.

6. The system according to claim 3, wherein each of the image forming conditions specifies the type of the image forming medium.

7. The system according to claim 3, wherein a condition specifying a type of the image forming medium is output medium information including a thick paper, color-dedicated paper, normal paper, or OHP.

8. The system according to claim 3, having change means for changing the read conditions and the image forming conditions displayed in form of the list.

9. An image-processing system comprising a plurality of devices, each having a function of reading an original image and inputting image data, or a function of printing on an output medium an image represented by the image data, or both functions, wherein one of the devices has:

first designating means for designating the device as master;

first notifying means for informing the other devices that the first designating means has designated the device as master and the other devices as slaves;

second designating means for designating any other device that is capable of printing images, after the first notifying means has operated;

first receiving means for receiving printer-performance information from the other device capable of printing images and designate by the second designating means;

memory means for storing the printer-performance information received by the first receiving means;

third designating means for designating a plurality of other devices that have an input function, after the first notifying means has operated;

second notifying means for supplying image-inputting parameters and the printer-performance information to the other devices designated by the third designating means and having the input function, said image-inputting parameter being operating conditions;

second receiving means for receiving the image-inputting parameters and printer-performance information from any other device that has the input function, has been designated as a slave and has received the image-inputting parameters and printer-performance information from the second notifying means;

updating means for updating the image-inputting parameters and printer-performance information received by the second receiving means, for any other device that has the input function and has been designated as a slave;

processing means for inputting one-page image data to the memory means for any other device that has the input function and has been designated as a slave in accordance the image-inputting parameters and printer-performance information updated by the updating means; and first transferring means for transferring all data to be printed, to any other device capable of printing images when the processing means finishes processing the all one-page image data for any other device that has the input function and has been designated as a slave, wherein each of the devices having the input function and designated as slaves has:

third receiving means for receiving image-inputting parameters and printer-performance information from the master;

registering means for registering the image-inputting parameters and the printer-performance information which have been received by the third receiving means;

changing means for changing the image-inputting parameters and the printer-performance information which have been registered by the registering means;

third notifying means for supplying to the master the image-inputting parameters and the printer-performance information which have been changed by the changing means;

input means for inputting one-page image data in accordance with the image-inputting parameters changed by the changing means;

second transferring means for transferring to the master all one-page image data input by the inputting means;

fourth receiving means for receiving printer-performance information supplied from the master; and printing means for printing all data which is to be printed and which has been transferred from the master, in accordance with the printer-performance information received by the fourth receiving means.

10. The image-processing system according to 9, wherein the image-inputting parameters include image-attribute data, medium data and output formats, the image-attribute data includes an input-device number, a job ID, a file name, the number of pages, original size, magnification, color-or-black, format, density-adjusting mode, color-adjusting mode, editing mode, photographing mode and character mode, wherein the medium data includes thick-sheet data, ordinary-sheet data, and the output formats include rotation output, double-side output, finishing and sorting mode.

11. The image-processing system according to claim 9, wherein the printer-performance information includes performance data, operating condition data, error data and output-medium data.

* * * * *